United States Patent
Kitamura et al.

(10) Patent No.: US 10,449,459 B2
(45) Date of Patent: Oct. 22, 2019

(54) INFORMATION PROCESSING SYSTEM, SERVER DEVICE, AND RECORDING MEDIUM

(71) Applicant: NINTENDO CO., LTD., Kyoto (JP)

(72) Inventors: Noriko Kitamura, Kyoto (JP); Teruyuki Hirosawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1018 days.

(21) Appl. No.: 14/503,738

(22) Filed: Oct. 1, 2014

(65) Prior Publication Data

US 2015/0094152 A1 Apr. 2, 2015

(30) Foreign Application Priority Data

Oct. 1, 2013 (JP) ................................. 2013-206677

(51) Int. Cl.
- *A63F 13/814* (2014.01)
- *A63F 13/87* (2014.01)
- *A63F 13/30* (2014.01)

(52) U.S. Cl.
CPC ............ *A63F 13/814* (2014.09); *A63F 13/30* (2014.09); *A63F 13/87* (2014.09); *A63F 2300/552* (2013.01)

(58) Field of Classification Search
CPC ........ A63F 13/35; A63F 13/814; A63F 13/87; A63F 13/30; A63F 2300/552; A63F 2300/8047

See application file for complete search history.

(56) References Cited

U.S. PATENT DOCUMENTS

| 6,077,162 A | 6/2000 | Weiss |
| 2002/0129119 A1 | 9/2002 | Aoki et al. |
| 2003/0069069 A1 | 4/2003 | Kinjo et al. |
| 2008/0078758 A1* | 4/2008 | Shimura ................. A63F 13/10 219/717 |
| 2008/0102958 A1 | 5/2008 | Kitamura et al. |

(Continued)

FOREIGN PATENT DOCUMENTS

| JP | 2001-041640 | 2/2001 |
| JP | 2001-319073 A | 11/2001 |

(Continued)

OTHER PUBLICATIONS

Japanese Office Action (Decision of Refusal) dated Mar. 20, 2018 in corresponding Japanese Patent Application No. 2013-206677 (with translation).

(Continued)

*Primary Examiner* — Jasson H Yoo
(74) *Attorney, Agent, or Firm* — Nixon & Vanderhye, P.C.

(57) ABSTRACT

An example system includes an imparting part imparting value information to a user of each information processing device; and a joint information processing part performing information processing in accordance with joint operation of a user of one of the information processing devices and a user of another information processing device through a network. When a given imparting condition has been satisfied in accordance with information processing having been performed by the joint information processing part, the imparting part imparts the value information.

22 Claims, 13 Drawing Sheets

(56) References Cited

U.S. PATENT DOCUMENTS

| | | | | |
|---|---|---|---|---|
| 2009/0258700 | A1* | 10/2009 | Bright | A63F 13/10 463/31 |
| 2012/0289346 | A1* | 11/2012 | Van Luchene | A63F 13/792 463/42 |
| 2014/0187315 | A1* | 7/2014 | Perry | A63F 13/10 463/29 |
| 2014/0349758 | A1 | 11/2014 | Kimura et al. | |

FOREIGN PATENT DOCUMENTS

| | | |
|---|---|---|
| JP | 2002-268986 | 9/2002 |
| JP | 2003-103044 A | 4/2003 |
| JP | 2008-113766 | 5/2008 |
| JP | 2010-125115 | 6/2010 |
| JP | 2010-531159 | 9/2010 |
| JP | 2013-005919 A | 1/2013 |
| JP | 2013-042905 A | 3/2013 |
| JP | 2013-128583 | 7/2013 |
| JP | 2013-161243 | 8/2013 |
| JP | 2013-188495 | 9/2013 |
| WO | WO 2008/157477 A2 | 12/2008 |
| WO | WO 2013/111230 A1 | 8/2013 |
| WO | WO 2013/111389 | 8/2013 |

OTHER PUBLICATIONS

Miyai et al., "Effects of Positioning Information of Virtual Space for Real World", General Lecture Proceedings of FIT2004 The $3^{rd}$ Forum on Information Technology, The $3^{rd}$ separate volume, Image recognition and media understanding, Graphics and Image, Human Communication and Interaction, Japan, p. 401-402, Aug. 20, 2004.

Special Edition, Web de Hajimeru "Hitori Label" (Getting started "One-person label" with Web), Sound & Recording Nov. Japan, $26^{th}$ Volume No. 11, pp. 91-103, Nov. 1, 2007.

Notification of Reasons for Refusal issued for JPA-2013-206677 (with translation).

\* cited by examiner

FIG. 12

"TOMATO" ADMINISTRATION INFORMATION

| USER ID | NUMBER OF "TOMATOES" | TERM OF VALIDITY | ACQUISITION FACTOR |
|---|---|---|---|
| USER A | 29 | END OF SEPTEMBER, 2013 | PURCHASE |
| | 100 | END OF OCTOBER, 2013 | PURCHASE |
| | 50 | END OF DECEMBER, 2013 | IMPARTING |
| | 100 | END OF JANUARY, 2014 | PURCHASE |
| | 2 | EXPIRED | PURCHASE |
| USER B | ⋮ | ⋮ | ⋮ |
| USER C | ⋮ | ⋮ | ⋮ |
| ⋮ | ⋮ | ⋮ | ⋮ |

FIG. 13

| | TOMATO CHECK SCREEN | |
|---|---|---|
| | TERM OF VALIDITY | NUMBER OF OWNED "TOMATOES" |
| 🍅 | END OF SEPTEMBER, 2013 | 29 |
| 🍅 | END OF OCTOBER, 2013 | 100 |
| 🍅 | END OF DECEMBER, 2013 | 50 ☆ |
| 🍅 | END OF JANUARY, 2014 | 100 |
| 🍅 | EXPIRED | 2 |

CLOSE

INFORMATION PROCESSING SYSTEM, SERVER DEVICE, AND RECORDING MEDIUM

CROSS-REFERENCE TO RELATED APPLICATIONS

This application is based upon and claims the benefit of priority of the prior Japanese Patent Application No. 2013-206677, filed on Oct. 1, 2013, the entire contents of which are incorporated herein by reference.

FIELD

The technology herein relates to: an information processing system in which a server device distributes contents and then the contents are acquired by an information processing device; and a server device and a recording medium for implementing this system.

BACKGROUND AND SUMMARY

In the conventional art, a game system is known in which a plurality of game machines perform communication through a network so that a game such as a competition play and a cooperation play which a plurality of users are allowed to join is implemented. This allows a plurality of users in remote locations to enjoy a common game. An information processing system is also known in which a server device distributes various contents concerning a game and then a game machine acquires these contents by using a communication function. As such, when a communication function of a game machine is used, pleasure and convenience of a game that are not allowed to be obtained in a non-communication environment are allowed to be obtained by a user.

According to an aspect of the embodiment, an information processing system is an information processing system including a server device and a plurality of information processing devices, comprising: an imparting part imparting value information to a user of each information processing device; and a joint information processing part performing information processing in accordance with joint operation of a user of one of the information processing devices and a user of another information processing device through a network, wherein when a given imparting condition has been satisfied in accordance with information processing having been performed by the joint information processing part, the imparting part imparts the value information.

The object and advantages of the invention will be realized and attained by means of the elements and combinations particularly pointed out in the claims.
It is to be understood that both the foregoing general description and the following detailed description are exemplary and explanatory and are not restrictive of the invention.

These and other objects, features, aspects, and effects of the technique will become clearer from the following detailed description with reference to the accompanying drawings.

BRIEF DESCRIPTION OF THE DRAWINGS

FIG. 12 is a schematic diagram illustrating a non-limiting example of "tomato" administration information stored in a server device.
FIG. 13 is a schematic diagram illustrating a non-limiting example of a "tomato" check screen.

DETAILED DESCRIPTION OF NON-LIMITING EXAMPLE EMBODIMENTS

Figure 1:
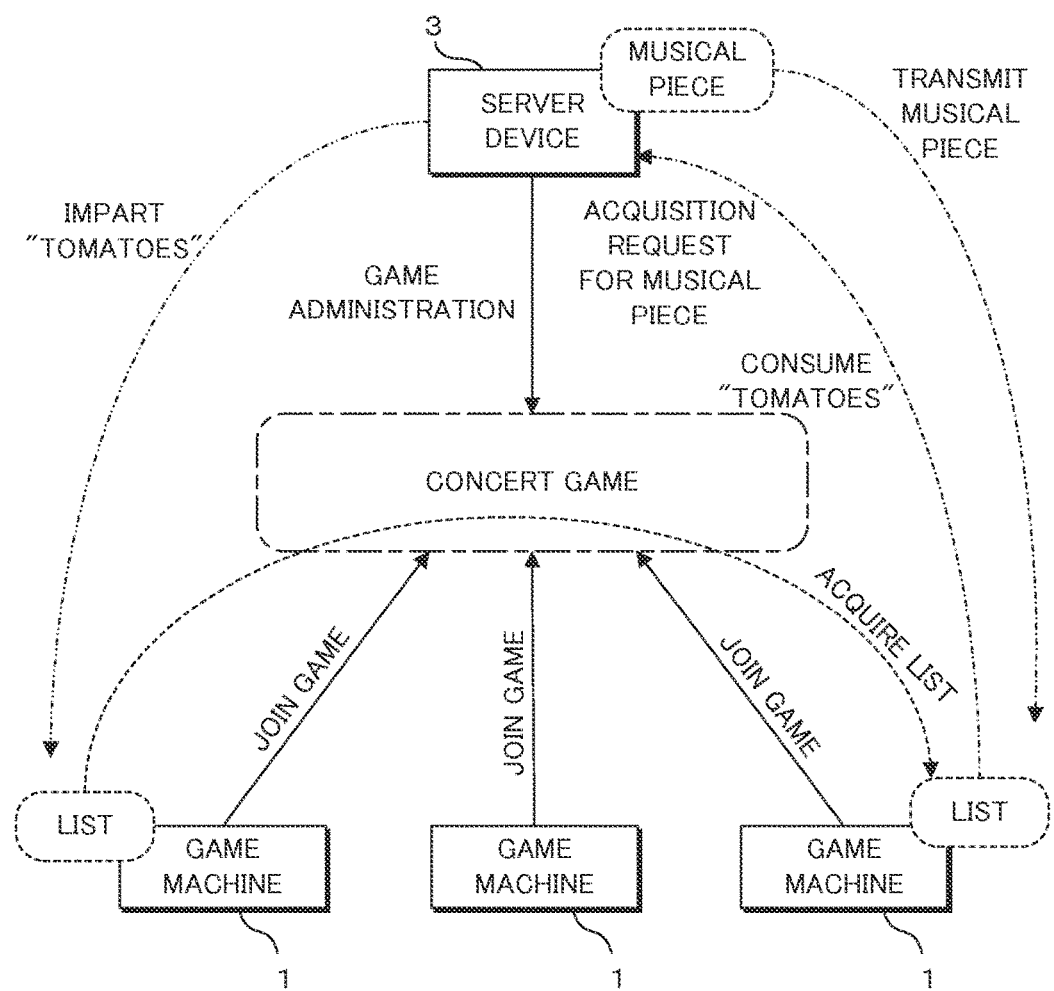
FIG. 1 is a schematic diagram used for describing outlines of a non-limiting example of an information processing system according to the embodiment.

<System Outlines>
FIG. 1 is a schematic diagram used for describing outlines of an information processing system according to the embodiment. The information processing system according to the embodiment is constructed from a server device 3 and a plurality of game machines 1. The server device 3 distributes contents. The game machine 1 acquires the distributed contents and then performs a game using the acquired contents. In the embodiment, the server device 3 distributes musical piece data as contents. The game machine 1 downloads the distributed musical piece data and then implements a game of playing a musical piece on the basis of the musical piece data. In the system, a plurality of game machines 1 perform communication through a network. This allows the system to implement a game that a plurality of users jointly play (play in concert) one musical piece. In such a concert game, the server device 3 administers the progress and the participants of the game and then a plurality of users is allowed to join through the game machines 1.

In the embodiment, each user is allowed to generate a recommendation list of musical pieces by using the game machine 1. The game machine 1 accepts generation operation for the recommendation list and then stores the generated recommendation list. When a concert game has been performed by a plurality of the game machines 1, each user having joined the concert game is allowed to acquire a recommendation list of musical pieces generated by another user. In the recommendation list, one or a plurality of musical pieces are registered. For example, a user performs display of a recommendation list on the game machine 1 and then performs operation of selecting one musical piece from the displayed musical piece so as to be allowed to perform acquisition request for the musical piece data to the server device 3. The server device 3 having received the acquisition request for the musical piece data from the game machine 1 reads the musical piece data and then transmits the data to the game machine 1 of requesting source.

Acquisition of musical piece data from the server device 3 performed by the game machine 1 is not limited to a method based on a recommendation list generated by a user. For example, the server device 3 transmits a popularity ranking, what's-new information, or the like to the game machine 1. Then, on the basis of such information, the user of the game machine 1 is allowed to select musical piece data to be acquired. For example, the game machine 1 accepts from the user a search request for musical piece data with specifying a title, an artist's name, or the like. The server device 3 transmits a search result to the game machine 1. On the basis of the search result, the user of the game machine 1 is allowed to select musical piece data.

In the embodiment, as a virtual currency (value information) in the game, a "tomato" is employed. For example, the user of each game machine 1 accesses the server device 3 or another device selling "tomatoes". The user purchases "tomatoes" by using a credit card, a prepaid card, or the like. For example, one "tomato" is sold for X yen and one piece of musical piece data is allowed to be acquired for Y "tomatoes". The "tomatoes" are administered in a manner of being in correspondence to identification information such as a user ID imparted to each user. When musical piece data is acquired by the game machine 1, "tomatoes" of the user using the game machine 1 are consumed by a necessary number.

When on the basis of a recommendation list generated by a user, another user has acquired musical piece data, the server device 3 performs the processing of imparting "tomatoes" to the user having generated the recommendation list. In the system, recommendation lists are delivered and received among users having jointly performed a concert game. Further, in the system, at the time of acquisition of musical piece data on the basis of a recommendation list, "tomatoes" are imparted to a person having generated the recommendation list. By virtue of this, in the system, "tomatoes" is allowed to be imparted to a user for free. This promotes users to join a concert game.

The game machine 1 accepts generation operation for a musical piece by the user. The game machine 1 is allowed to perform the processing of submitting the generated musical piece data to the server device 3. The server device 3 stores and distributes the musical piece data submitted from the game machine 1. When acquisition of the musical piece data has been performed by another user, the server device 3 imparts "tomatoes" to the person having generated the musical piece. For example, the server device 3 may impart "tomatoes" to the user having submitted the musical piece data when the number of times, the frequency, or the like of acquisition of the musical piece data by another user exceeds a threshold set forth in advance. The server device 3 aggregates the achievement in the concert game, and then opens a monthly ranking or the like to the public and imparts "tomatoes" to higher-rank winners. The server device 3 aggregates the frequency of joining of each user in the concert game, and then opens a monthly ranking or the like to the public and imparts "tomatoes" to higher-rank winners. As such, the server device 3 imparts "tomatoes" to users by a plurality of methods. This promotes users to join the system.

In the embodiment, for example, the server device 3 opens, to the public, recommendation lists generated by users such as celebrities, famous people, or the like. The user is allowed to acquire through the game machine 1 such a recommendation list opened to the public by the server device 3. The user is allowed to acquire musical piece data by using the acquired recommendation list. The recommendation lists generated by celebrities, famous people, or the like are opened to the public and allowed to be acquired directly from the server device 3 without the necessity of each user joining the concert game. Even when acquisition of musical piece data has been performed on the basis of a recommendation list generated by a celebrity, famous people, or the like, the server device 3 does not impart "tomatoes" to the user who is a celebrity, famous people, or the like having generated the recommendation list.

<System Configuration>

Figure 2:
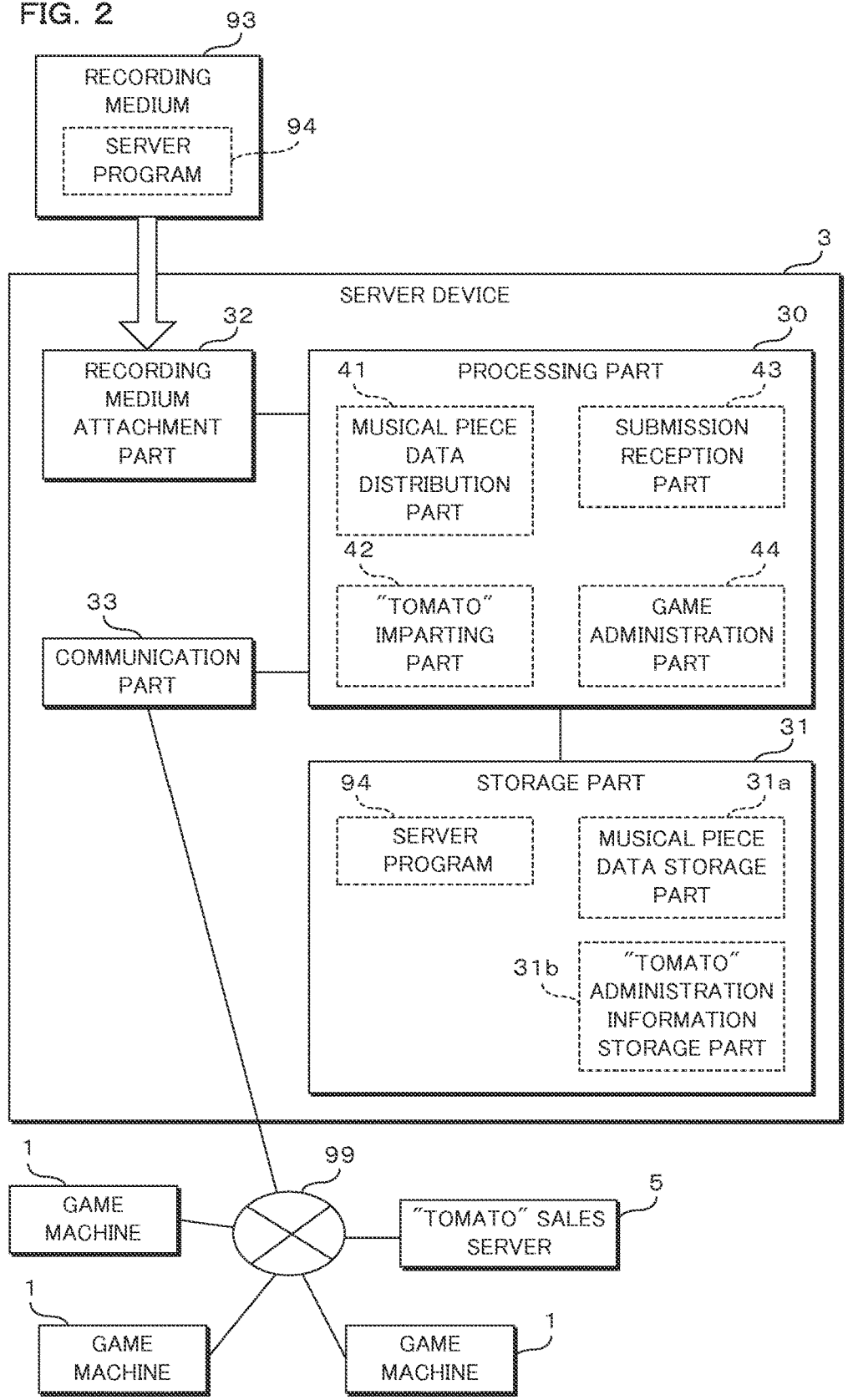
FIG. 2 is a block diagram illustrating a configuration of a non-limiting example of a server device.

FIG. 2 is a block diagram illustrating the configuration of the server device 3. The server device 3 according to the embodiment includes a processing part 30, a storage part 31, a recording medium attachment part 32, a communication part 33, and the like. The processing part 30 is constructed from an arithmetic processing unit such as a CPU (Central Processing Unit). The processing part 30 reads and executes a server program 94 stored in the storage part 31 so as to perform the processing of distribution of musical piece data, administration of a concert game, imparting of "tomatoes", and the like. The storage part 31 is constructed from a non-transitory storage device. The storage part 31 is allowed to store programs such as the server program 94 and various kinds of data. In the embodiment, the storage part 31 includes a musical piece data storage part 31a storing a large amount of musical piece data for distribution. The storage part 31 includes a "tomato" administration information storage part 31b storing information for administration of the "tomatoes" owned by the users.

The recording medium attachment part 32 is constructed such that a recording medium 93 having a disk shape or the like is allowed to be attached and detached. The processing part 30 is allowed to read the server program 94 and other various kinds of data from the recording medium 93 attached to the recording medium attachment part 32 and then install them into the storage part 31. The communication part 33 transmits and receives data to and from the game machine 1 or the "tomato" sales server 5 through a network 99 such as the Internet. For example, when an acquisition request for musical piece data has been received from the game machine 1 through the communication part 33, the server device 3 reads the musical piece data from the musical piece data storage part 31a of the storage part 31 and then transmits the musical piece data to the game machine 1 through the communication part 33.

In the server device 3 according to the embodiment, when the processing part 30 executes the server program 94, a musical piece data distribution part 41, a "tomato" imparting part 42, a submission reception part 43, a game administration part 44, and the like are implemented as software-based functional blocks.

The musical piece data distribution part 41 performs the processing of transmitting the musical piece data stored in the musical piece data storage part 31a of the storage part 31, in accordance with a request from the game machine 1. The musical piece data distribution part 41 performs the processing of generating information such as a popularity ranking of musical pieces and what's-new information and then disclosing these information to the game machine 1. The musical piece data distribution part 41 performs the processing of, when a search request in which a search condition such as the title of a musical piece and the name of an artist is specified has been received from the game machine 1 through the communication part 33, generating a list of musical pieces corresponding to the search condition and then transmitting the list to the game machine 1. The musical piece data distribution part 41 performs the processing of opening, to the public, recommendation lists generated by celebrities, famous people, or the like.

When a given imparting condition has been satisfied, the "tomato" imparting part 42 imparts "tomatoes" to the user for free. The "tomato" imparting part 42 performs administration processing for "tomatoes" owned by each user. The "tomato" administration information storage part 31b of the storage part 31 stores information such as the number of owned "tomatoes" and the term of validity of the owned "tomatoes" for each user using the system. When the musical piece data distribution part 41 has transmitted musical piece data to the game machine 1, the "tomato" imparting part 42 sequentially consumes the "tomatoes" owned by the user using the game machine 1, starting from one having the nearest term of validity. When sales of "tomatoes" is performed by the "tomato" sales server 5, the "tomato" imparting part 42 increases the number of owned "tomatoes" of the user having purchased and then stores information such as the term of validity of the purchased "tomatoes" into the "tomato" administration information storage part 31b. Even when the "tomatoes" have been imparted for free at a time that a given imparting condition has been satisfied, the "tomato" imparting part 42 similarly updates the information such as the number of owned "tomatoes" and the term of validity thereof for the corresponding user. The "tomato" imparting part 42 performs the processing of deleting information concerning the "tomatoes" whose term of validity has elapsed, from the "tomato" administration information storage part 31b.

When an acquisition request for musical piece data has been received from the game machine 1 through the communication part 33 and then the musical piece data distribution part 41 has transmitted the musical piece data, the "tomato" imparting part 42 judges whether the acquisition request has been placed on the basis of a recommendation list of musical pieces. When the acquisition request has been placed on the basis of a recommendation list, the "tomato" imparting part 42 imparts "tomatoes" to the user having generated the recommendation list. At that time, the "tomato" imparting part 42 may impart one "tomato" for one time of use of the recommendation list or alternatively may impart Y "tomatoes" for X times of use.

When the musical piece data distribution part 41 has transmitted musical piece data to the game machine 1, the "tomato" imparting part 42 imparts "tomatoes" to the user having generated and submitted the musical piece data. The "tomato" imparting part 42 imparts "tomatoes" to the user in accordance with the achievement or the like of the concert game. Here, the achievement or the like of the concert game is administered by the game administration part 44. For example, at a frequency of once a month or the like, the "tomato" imparting part 42 acquires the achievement or the like of the concert game from the game administration part 44 and thereby determines users to whom "tomatoes" are to be imparted. For example, the "tomato" imparting part 42 imparts a given number of "tomatoes" to users who are higher-rank winners in a monthly ranking of the achievement in the concert game. For example, the "tomato" imparting part 42 imparts a given number of "tomatoes" to users who are higher-rank winners in a monthly ranking of the number of times of joining the concert game by the user.

The submission reception part 43 performs the processing of receiving submission of musical piece data generated by the game machine 1. The submission reception part 43 stores the submitted musical piece data into the musical piece data storage part 31a of the storage part 31 and then adds the data to the distribution objects of the musical piece data distribution part 41. Here, it may be examined in advance whether the submitted musical piece data violates copyright or the like. Then, only musical piece data having passed the examination may be added to the distribution objects. Such examination may be performed by the server device 3 or alternatively by another device.

The game administration part 44 administers information such as the achievement in the concert game and the number of times of joining. The game administration part 44 performs the processing of suitably extracting, for example, five to ten or the like users as concert members from among a plurality of users who desire to join the concert game. In the embodiment, the game administration part 44 extracts a given number of users at random. When an experience value, a level, or the like concerning performance is assigned to each user, the game administration part 44 may extract users with taking these into consideration. In the concert game, one or a plurality of musical pieces are played by the plurality of users extracted by the game administration part 44. In the concert game, a mark indicating goodness or poorness of the performance is calculated as the achievement of the entire members by the game administration part 44. At each time of performing the concert game, the game administration part 44 stores the number of times of joining by each user, the achievement in the game, and the like.

In the embodiment, after play in concert has been performed in the concert game, an occasion of exchanging information such as the profile of each user having joined the play in concert is provided. The game administration part 44 transmits information concerning all users having joined the play in concert, to the game machines 1 having joined the concert game. In each game machine 1, the information concerning the other users having played in concert in the concert game is allowed to be browsed. At that time, the user is allowed to request acquisition of a recommendation list by another user, to the server device 3 through the game machine 1.

Here, the deliver and reception of the information concerning the users may be performed directly among the plurality of game machines 1 without the intervention of the server device 3. For example, when the plurality of game machines 1 are allowed to perform direct communication through a network such as the Internet or alternatively when the plurality of game machines 1 are allowed to perform direct wireless communication by using wireless communication or the like, such direct transfer and reception of information may be adopted.

In the embodiment, the recommendation list by each user is not stored in the server device 3 and is stored in the game machine 1 used by each user. Thus, when a recommendation list acquisition request is received from the game machine 1, the game administration part 44 of the server device 3 transmits a transmission request for the recommendation list to the game machine 1 of the user whose recommendation list has been requested. In response to the transmission request, the recommendation list is transmitted from the game machine 1 to the server device 3. The game administration part 44 of the server device 3 transmits the received recommendation list to the game machine 1 of sender of the acquisition request. The game machine 1 stores the recommendation list by another user acquired from the server device 3. After that, the user of the game machine 1 is allowed to acquire musical piece data by using the recommendation list.

Figure 3:
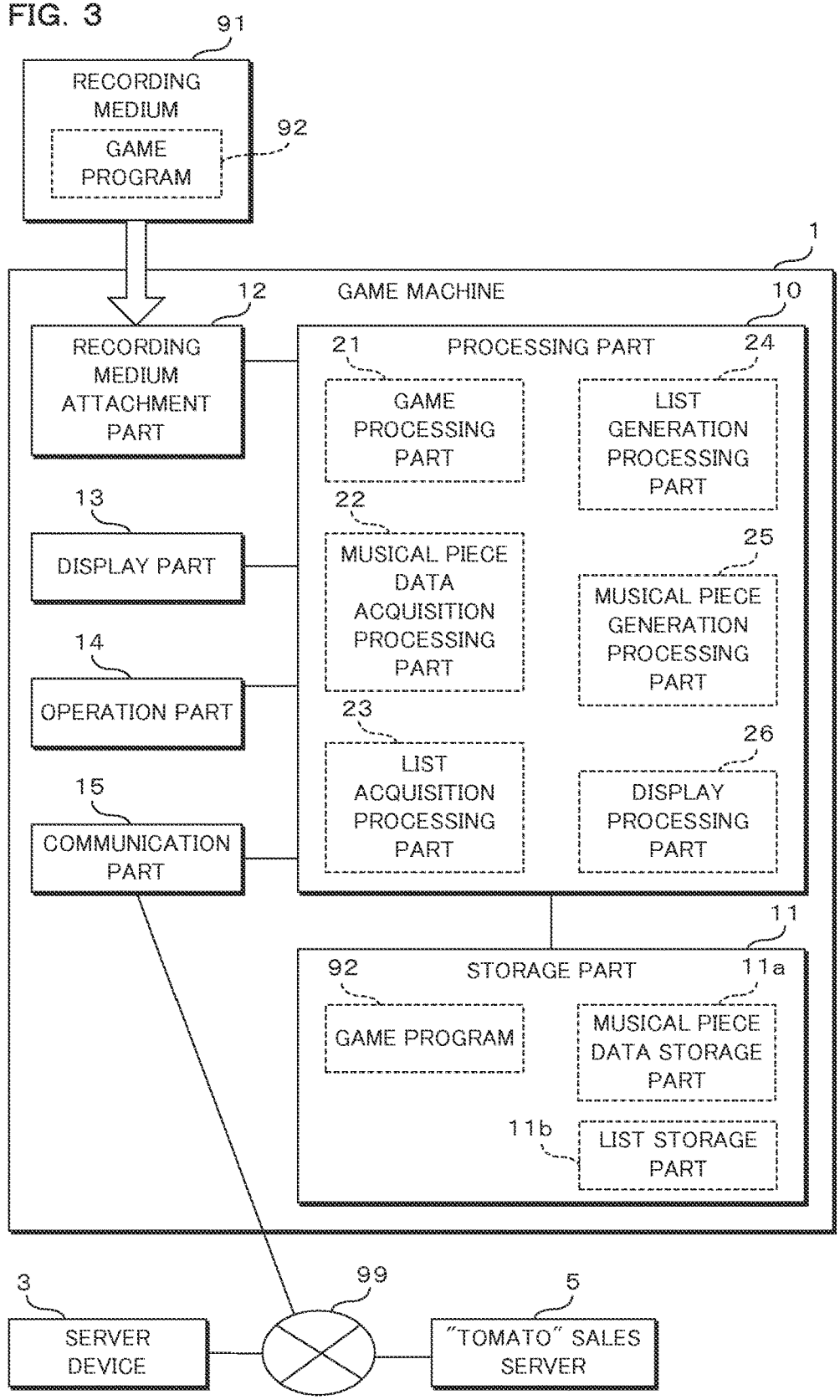
FIG. 3 is a block diagram illustrating a configuration of a non-limiting example of a game machine.

FIG. 3 is a block diagram illustrating the configuration of the game machine 1. The game machine 1 according to the embodiment includes a processing part 10, a storage part 11, a recording medium attachment part 12, a display part 13, an operation part 14, a communication part 15, and the like. The processing part 10 is constructed from an arithmetic processing unit such as a CPU. The processing part 10 reads and executes a game program 92 stored in the storage part 11 or alternatively a game program 92 recorded on a recording medium 91 attached to the recording medium attachment part 12. By virtue of this, the processing part 10 performs various kinds of information processing concerning the game. For example, the processing part 10 performs the processing of accepting operation performed in the operation part 14. For example, the processing part 10 performs the processing of judgment or the like in the game in response to the accepted operation. For example, the processing part 10 performs the processing of generating a game image to be displayed on the display part 13 in response to the accepted operation or alternatively to an event or the like in the game.

The storage part 11 is constructed from a non-transitory storage device. The storage part 11 is allowed to store programs such as the game program 92 and various kinds of data necessary for program execution. The storage part 11 includes a musical piece data storage part 11a storing musical piece data acquired from the server device 3. The storage part 11 includes a list storage part 11b storing: a recommendation list generated in the game machine 1; a recommendation list by another user acquired from the server device 3; and the like.

The recording medium attachment part 12 is constructed such that the recording medium 91 such as a memory card is allowed to be attached and detached. The processing part 10 is allowed to read the game program 92 and other various kinds of data from the recording medium 91 attached to the recording medium attachment part 12. The display part 13 is constructed from a liquid crystal panel or the like and displays the image imparted from the processing part 10. For example, the operation part 14 is constructed from push buttons or from a touch panel provided in the display part 13. The operation part 14 notifies to the processing part 10 the contents of operation (e.g., push operation of a button and contact to the touch panel) performed by the user.

The communication part 15 realizes connection to the network 99 such as the Internet by using a wireless LAN (Local Area Network) or the like. The communication part 15 transmits and receives data to and from the server device 3, the "tomato" sales server 5, or the like through the network 99. For example, the game machine 1 performs communication with the server device 3 through the communication part 15 so as to be allowed to join the concert game, acquire the musical piece data, and the like. For example, the game machine 1 is allowed to purchase "tomatoes" necessary for acquisition of musical piece data, by performing communication with the "tomato" sales server 5 through the communication part 15.

In the game machine 1 according to the embodiment, when the processing part 10 executes the game program 92, a game processing part 21, a musical piece data acquisition processing part 22, a list acquisition processing part 23, a list generation processing part 24, a musical piece generation processing part 25, a display processing part 26, and the like are implemented as software-based functional blocks.

In response to operation or the like by the user accepted through the operation part 14, the game processing part 21 performs various judgment processing, event processing, or the like concerning the game. In the embodiment, the game processing part 21 reproduces musical piece on the basis of the musical piece data stored in the musical piece data storage part 11a of the storage part 11. The game processing part 21 accepts, through the operation part 14, operation of a virtual musical instrument for the reproduced musical piece. By virtue of this, the game processing part 21 implements the game of playing the musical instrument. In accordance with the operation timing and the like of the operation part 14 for the reproduced musical piece, the game processing part 21 adds or reduces a point so as to calculate the achievement in the performance. The game is allowed to be performed by one user alone of the game machine 1 or alternatively in a joint manner together with other users through the network. When play in concert is to be performed by a plurality of users, the game processing part 21 transmits operating contents and the like accepted through the operation part 14, to the server device 3 or other game machines 1.

The musical piece data acquisition processing part 22 transmits an acquisition request for musical piece data to the server device 3. The musical piece data acquisition processing part 22 performs the processing of receiving the musical piece data transmitted from the server device 3 in response to the acquisition request, and then storing the data into the musical piece data storage part 11a of the storage part 11. The musical piece data acquisition processing part 22 displays a recommendation list stored in the list storage part 11b onto the display part 13. The musical piece data acquisition processing part 22 accepts, through the operation part 14, selection operation of a musical piece contained in the recommendation list. The musical piece data acquisition processing part 22 performs acquisition request for the musical piece data of the selected musical piece. The musical piece data acquisition processing part 22 may acquire a list of distributed musical piece data from the server device 3 and then, on the basis of this distribution list, may accept selection of a musical piece to be acquired. For example, the distribution list acquired from the server device 3 may be a list of musical pieces such as a popularity ranking, what's-new information, and a result of search by a keyword.

After the concert game has been performed jointly together with other users, the list acquisition processing part 23 performs the processing of acquiring recommendation lists generated by the other users and then storing the lists into the list storage part 11b of the storage part 11. On the occasion of information exchange after the concert game, the list acquisition processing part 23 performs the processing of receiving, from the server device 3, information concerning the users having joined the concert game and then displaying the information on the display part 13. At that time, the list acquisition processing part 23 accepts, through the operation part 14, selection of a user to whom recommendation list acquisition request is to be performed. The list acquisition processing part 23 transmits to the server device 3 an acquisition request for the recommendation list by the selected user. The list acquisition processing part 23 receives the recommendation list transmitted from the server device 3 in response to the acquisition request and then stores the list into the list storage part 11b. The list acquisition processing part 23 performs acquisition request for a recommendation list generated by a celebrity, famous people, or the like opened to the public by the server device 3. The list acquisition processing part 23 performs the processing of storing into the list storage part 11b the recommendation list acquired from the server device 3.

The list generation processing part 24 accepts, through the operation part 14, operation concerning generation of a recommendation list of musical pieces to other users. The list generation processing part 24 performs the processing of storing the generated recommendation list into the list storage part 11b of the storage part 11. The list generation processing part 24 reads the recommendation list generated and stored in the list storage part 11b. The generated recommendation list indicates the recommendation list generated by the user of the game machine 1. The list generation processing part 24 performs the processing of accepting editing operation for the recommendation list and then updating the recommendation list. When a transmission request for the recommendation list is received from the server device 3, the newest recommendation list generated or edited in the list generation processing part 24 is transmitted to the server device 3.

The musical piece generation processing part 25 accepts, through the operation part 14, operation of generating, editing, or the like of a musical piece. The musical piece generation processing part 25 performs the processing of storing the musical piece data of the generated or edited musical piece into the musical piece data storage part 11a of the storage part 11. For example, the musical piece generation processing part 25 displays on the display part 13 a musical score where musical notes and the like are not arranged. The musical piece generation processing part 25 accepts arrangement operation for musical notes and the like into the displayed musical score and thereby accepts generation operation for the musical piece. In response to operation by the user, the musical piece generation processing part 25 performs the processing of submitting the generated musical piece to the server device 3.

The display processing part 26 performs the processing of generating a game screen corresponding to the processing result of the game processing part 21 and then imparting the data to the display part 13 so as to display the game screen on the display part 13. The display processing part 26 performs display processing for the recommendation list stored in the list storage part 11b of the storage part 11. The display processing part 26 performs the processing of displaying the information concerning each user on the occasion of information exchange after the concert game. The display processing part 26 performs display processing for a screen used for generating a recommendation list in the list generation processing part 24. The display processing part 26 performs display processing and the like for a screen used for generating a musical piece in the musical piece generation processing part 25.

The display processing part 26 displays the information concerning the "tomatoes" owned by the user. For example, when the item of information display concerning "tomatoes" is selected by the user in the menu screen or the like, the processing part 10 of the game machine 1 performs transmission request to the server device 3 for the "tomato" administration information concerning the user. The server device 3 having received the transmission request reads the "tomato" administration information concerning the corresponding user from the "tomato" administration information storage part 31b of the storage part 31 and then transmits the information to the game machine 1. The processing part 10 of the game machine 1 having received the "tomato" administration information from the server device 3 performs through the display processing part 26 the processing of displaying on the display part 13 the number, the term of validity, and the like of the "tomatoes" owned by the user.

In the embodiment, the display processing part 26 displays the number of "tomatoes" in the order of the term of validity. At that time, the display processing part 26 displays an image imitating the external appearance of a tomato and then displays the term of validity and the number of "tomatoes" on a side of the image. The display processing part 26 displays mutually different tomato images in accordance with the remaining term of validity. For example, the display processing part 26 displays an image of a fresh tomato for "tomatoes" whose remaining term of validity is one month or longer. In contrast, the display processing part 26 displays an image of a half-rotten tomato for "tomatoes" whose remaining term of validity is less than one month. The display processing part 26 may display an image of a rotten tomato for "tomatoes" whose term of validity has elapsed.

Although a detailed configuration is not illustrated, the "tomato" sales server 5 performs communication with the game machine 1 and thereby performs the processing of selling "tomatoes" necessary for acquiring musical piece data. For example, the "tomato" sales server 5 performs user authentication processing on the basis of information concerning the user ID, the password, and the like transmitted from the game machine 1. When the authentication has been successful, the "tomato" sales server 5 accepts the "tomato" purchase request from the game machine 1. The "tomato" sales server 5 having received the purchase request accepts input of information concerning the user's credit card and the like and then performs accounting processing. When the accounting processing has been completed normally, the "tomato" sales server 5 transmits, to the server device 3, information such as the user to whom the "tomatoes" has been sold, the number of sold pieces, the term of validity, and the like. In the server device 3 having received the information from the "tomato" sales server 5, the "tomato" imparting part 42 of the processing part 30 updates the information stored in the "tomato" administration information storage part 31b of the storage part 31.

<Game>

In the game machine 1 according to the embodiment, when the processing part 10 executes the game program 92, the game of playing a musical piece is implemented by the game processing part 21. This musical piece playing game is allowed to be enjoyed by one user alone without using the communication function of the game machine 1. The musical piece playing game is also allowed to be enjoyed as a concert game by a plurality of users by using the communication function.

For example, when the item of play solo is selected in the menu screen or the like, the game processing part 21 displays a list or the like of musical piece data stored in the musical piece data storage part 11a. In the game processing part 21, selection of a musical piece to be played through the game is accepted through the operation part 14. After the musical piece has been selected, the game processing part 21 displays a list of musical instruments allowed to be played. Then, selection of a musical instrument to be played through the game is accepted through the operation part 14. In addition to these, for example, the game processing part 21 may accept setting of difficulty or the like in the game. After the setting of information necessary for the game, the game processing part 21 starts the playing game of the musical piece. The game processing part 21 starts reproduction of the selected musical piece and starts acceptance of playing operation of the virtual musical instrument.

In the playing game of the musical piece, the game processing part 21 compares the normal timing of playing operation set forth depending on the musical piece and the musical instrument with the actual timing of the user operation of the operation part 14. The game processing part 21 calculates a mark of the performance in accordance with the time difference of the actual timing from the normal timing. At that time, the game processing part 21 may display through the display processing part 26 onto the display part 13 an animation image indicating the normal timing of playing operation to the user. On completion of playing the musical piece, the game processing part 21 displays the final mark on the display part 13.

For example, when the item of concert using the communication function has been selected in the menu screen or the like, the game processing part 21 performs communication with the server device 3 through the communication part 15 so as to perform request for joining the concert game. At that time, the game processing part 21 may accept selection of a musical piece, a musical instrument, and the like desired by the user to play and then notify to the server device 3 the information such as the selected musical piece and the selected musical instrument.

In the server device 3 having received the joining request for the concert game from the game machine 1 through the communication part 33, the game administration part 44 registers into a waiting list the information concerning the user having placed the joining request. From among the users who wait for joining the concert game, the game administration part 44 extracts a given number of users on the basis of an appropriate condition so as to adopt them as members who are to jointly perform the concert game. In the embodiment, the game administration part 44 extracts at random the given number of users from the waiting list. The game administration part 44 notifies to the game machines 1 of the plurality of extracted users that the members of concert have been determined, and then starts the concert game.

The game processing for implementing the concert game may be performed by each game machine 1 or alternatively by the server device 3. In the embodiment, the game processing is performed by the game processing part 21 of each game machine 1. The game administration part 44 of the server device 3 acquires information such as the operation timing of each user who is joining the concert game, and then transmits the information to each game machine 1. Calculation of the mark of the performance of each user is performed by the game processing part 21 of each game machine 1. On completion of the play in concert, the game administration part 44 of the server device 3 acquires each user's mark from each game machine 1 and then calculates the mark of the play in concert of the entire members. The game administration part 44 stores the calculated mark as each user's achievement into the storage part 31.

Figure 4:
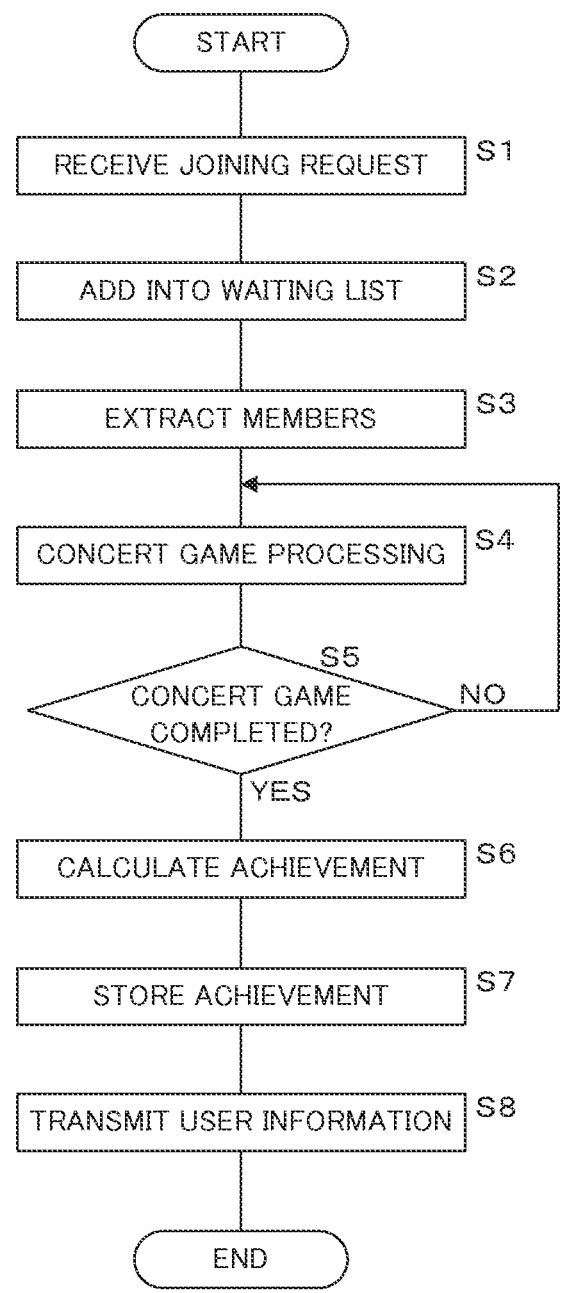
FIG. 4 is a flow chart illustrating a non-limiting example of a procedure of administration processing for a concert game performed by a server device.

FIG. 4 is a flow chart illustrating a procedure of administration processing for the concert game performed by the server device 3. The game administration part 44 of the processing part 30 of the server device 3 receives a joining request for the concert game from the game machine 1 through the communication part 33 (step S1). The game administration part 44 adds into the waiting list the information concerning the user and the game machine 1 corresponding to the received joining request (step S2). From among the users registered in the waiting list, the game administration part 44 appropriately extracts a necessary number of users as members (step S3).

The game administration part 44 performs the processing concerning the concert game performed by the extracted members (step S4). Here, the game administration part 44 performs the processing of, for example, acquiring the operation accepted by each game machine 1 and then transmitting to the other game machines 1 joining the concert game. The game administration part 44 judges whether the concert game has been completed (step S5). When the concert game is not yet completed (S5: NO), the game administration part 44 returns the processing to step S4. When the concert game has been completed (S5: YES), the game administration part 44 calculates the total achievement of all users having joined the concert game (step S6). The game administration part 44 stores the calculated achievement into the storage part 31 in a manner of being in correspondence to each user having joined (step S7). The game administration part 44 transmits information such as the profiles of all users having joined the concert game to the game machines 1 having joined the concert game (step S8) and then terminates the processing.

In the embodiment, a configuration has been employed that the processing of transmitting user operation accepted by each game machine 1 joining the concert game to the other game machines 1, the processing of calculating the achievement in the game, and the like are performed by the server device 3. However, employable configurations are not limited to this. For example, each game machine 1 may transmit the user operation accepted by itself to the other game machines 1 directly. For example, each game machine 1 may calculate the game achievement of its own user and then transmit the data to the other game machines 1. Then, at the same time, each game machine 1 may receive the achievement of the other users transmitted from the other game machines 1 and then calculate the total achievement. For example, each game machine 1 having joined the concert game may transmit the information such as the user's profile directly to the other game machines 1 without the intervention of the server device 3.

When such a configuration is employed, it is sufficient that the server device 3 extracts the joining members before the start of the concert game. Further, it is sufficient that on completion of the concert game, the server device 3 performs the processing of acquiring the achievement from each game machine 1 and storing the data into the storage part 31.

<Acquisition of Recommendation List>

Figure 5:
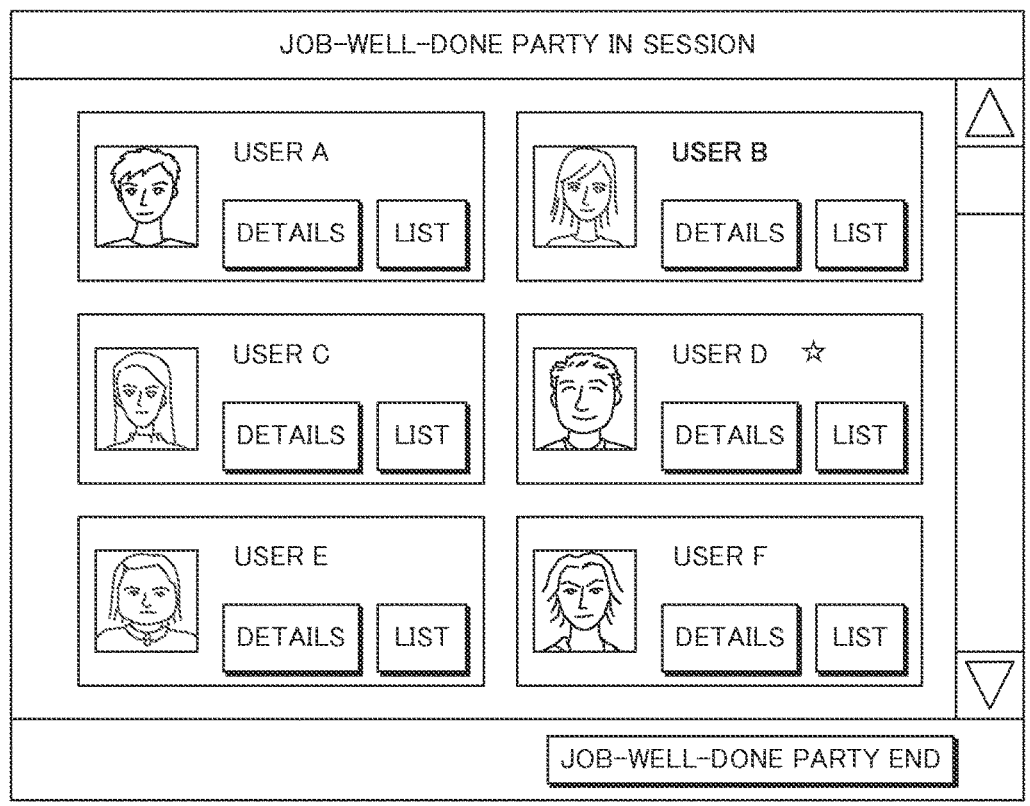
FIG. 5 is a schematic diagram illustrating a non-limiting example of a job-well-done party screen displayed by a game machine.

After the concert game has been performed by the plurality of users, on the occasion of information exchange of the users having joined the concert game, the game processing part 21 of each game machine 1 holds a job-well-done party of the play in concert. At that time, on the basis of the information of the users having joined transmitted from the server device 3, the display processing part 26 of the game machine 1 displays a job-well-done party screen on the display part 13. FIG. 5 is a schematic diagram illustrating an example of the job-well-done party screen displayed by the game machine 1. In the illustrated job-well-done party screen, a title "job-well-done party in session" is displayed in the uppermost part. In the job-well-done party screen, a job-well-done party end button used for accepting operation of closing the job-well-done party is provided in the lowermost part. In the center part of the job-well-done party screen, approximately rectangular regions are arranged in the form of a matrix. One region is assigned to one user so that the users having joined are displayed in a list form.

In each of the approximately rectangular regions, the user name and an image such as the portrait of the user are displayed. In each region, a details button and a list button are displayed. The details button is a button used for displaying detailed information such as the user's profile. The list button is a button used for acquiring a recommendation list generated by the user. For a user having performed the most excellent performance in the concert game, that is, for the user having achieved the highest mark, an asterisk is attached on a side of the user name. When operation has been performed on the details button, on the basis of the information received from the server device 3, the game processing part 21 displays detailed information such as the profile of the corresponding user. Here, displaying of the detailed information is not illustrated. For example, the game processing part 21 is allowed to display as the detailed information the age, the sex, a favorite musical instrument, a favorite music genre, a favorite artist, and the like of the user.

When operation has been performed on the list button, the list acquisition processing part 23 of the game machine 1 performs recommendation list acquisition request to the server device 3 with specifying the corresponding user's user name or the like. The server device 3 having received the recommendation list acquisition request from the game machine 1 imparts a transmission request for the recommendation list to the game machine 1 used by the user specified in the acquisition request. The game machine 1 having received the transmission request for the recommendation list reads the recommendation list from the list storage part 11b of the storage part 11 and then transmits the recommendation list to the server device 3. The server device 3 having received the recommendation list from the game machine 1 transmits the received recommendation list to the game machine 1 of sender of the acquisition request. The game machine 1 having received the recommendation list from the server device 3 stores the received recommendation list into the list storage part 11b of the storage part 11. The display processing part 26 of the game machine 1 performs the processing of displaying the recommendation list on the display part 13.

Here, a configuration may be employed that the list button is not provided in the job-well-done party screen. In this case, for example, a configuration may be employed that after the concert game, the recommendation lists by the users having joined the concert game are automatically transmitted to the other users. Further, in this case, a configuration may be employed that as long as extraction of the members who are to join the concert game has already been performed by the server device 3, transmission and reception of the recommendation lists is performed automatically before the start of the concert game.

Figure 6:
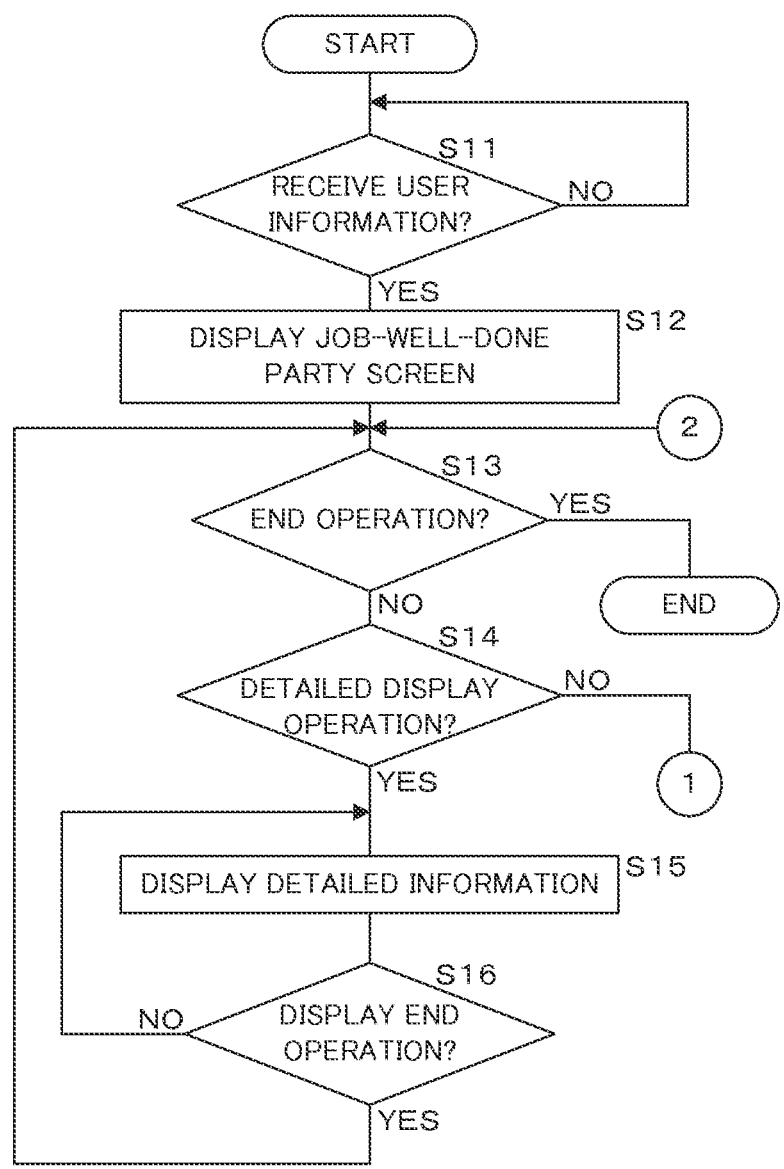
FIG. 6 is a flow chart illustrating a non-limiting example of a procedure of recommendation list acquisition processing performed by a game machine.
Figure 7:
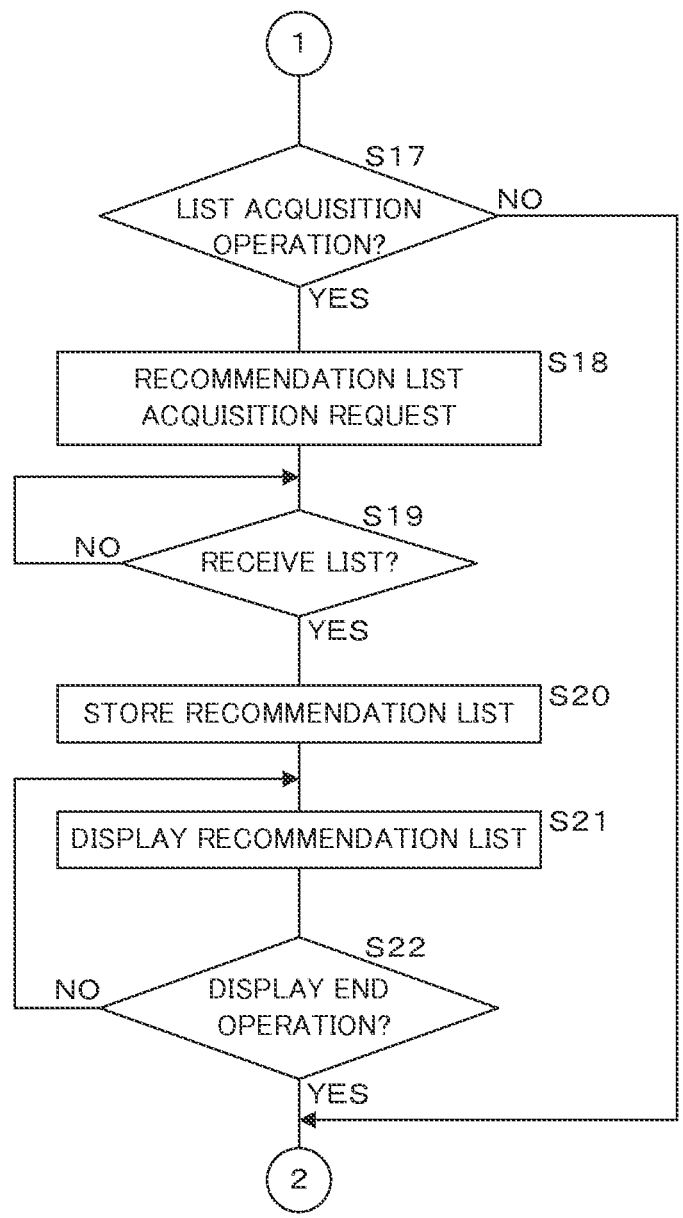
FIG. 7 is a flow chart illustrating a non-limiting example of a procedure of recommendation list acquisition processing performed by a game machine.

FIGS. 6 and 7 are flow charts illustrating a procedure of recommendation list acquisition processing performed by the game machine 1. On completion of the concert game, the processing part 10 of the game machine 1 judges whether user information from the server device 3 has been received through the communication part 15 (step S11). When user information is not yet received (S11: NO), the processing part 10 waits until user information is received. When user information has been received (S11: YES), on the basis of the received user information, the game processing part 21 of the processing part 10 displays the job-well-done party screen on the display part 13 through the display processing part 26 (step S12).

After displaying the job-well-done party screen, the game processing part 21 of the processing part 10 judges whether end operation has been performed on the end button of the job-well-done party screen (step S13). When end operation has been performed (S13: YES), the game processing part 21 terminates the recommendation list acquisition processing. When end operation is not yet performed (S13: NO), the game processing part 21 judges whether detailed display operation has been performed on the details button in the job-well-done party screen (step S14). When detailed display operation has been performed (S14: YES), on the basis of the user information received at step S11, the game processing part 21 displays the detailed information of the user concerning the operated details button (step S15). A displaying the detailed information, the game processing part 21 judges whether display end operation for the detailed information has been performed (step S16). When display end operation is not yet performed (S16: NO), the game processing part 21 returns the processing to step S15 so as to continue displaying the detailed information. When display end operation has been performed (S16: YES), the game processing part 21 returns the processing to step S13.

When detailed display operation is not yet performed on the details button in the job-well-done party screen (S14: NO), the game processing part 21 judges whether list acquisition operation has been performed on the list button (step S17). When list acquisition operation is not yet performed (S17: NO), the game processing part 21 returns the processing to step S13. When list acquisition operation has been performed (S17: YES), the list acquisition processing part 23 of the processing part 10 performs recommendation list acquisition request for the user concerning the operated list button to the server device 3 (step S18). The list acquisition processing part 23 judges whether the recommendation list has been received from the server device 3 (step S19). When the recommendation list is not yet received (S19: NO), the list acquisition processing part 23 waits until the recommendation list is to received.

When the recommendation list has been received from the server device 3 (S19: YES), the list acquisition processing part 23 stores the received recommendation list into the list storage part 11b of the storage part 11 (step S20). The display processing part 26 of the processing part 10 displays the received recommendation list on the display part 13 (step S21). The game processing part 21 judges whether display end operation for the displayed recommendation list has been received (step S22). When display end operation is not yet received (S22: NO), the game processing part 21 returns the processing to step S21 so as to continue displaying the recommendation list. When display end operation has been received (S22: YES), the game processing part 21 returns the processing to step S13 so as to continue displaying the job-well-done party screen until end operation is received.

Figure 8:
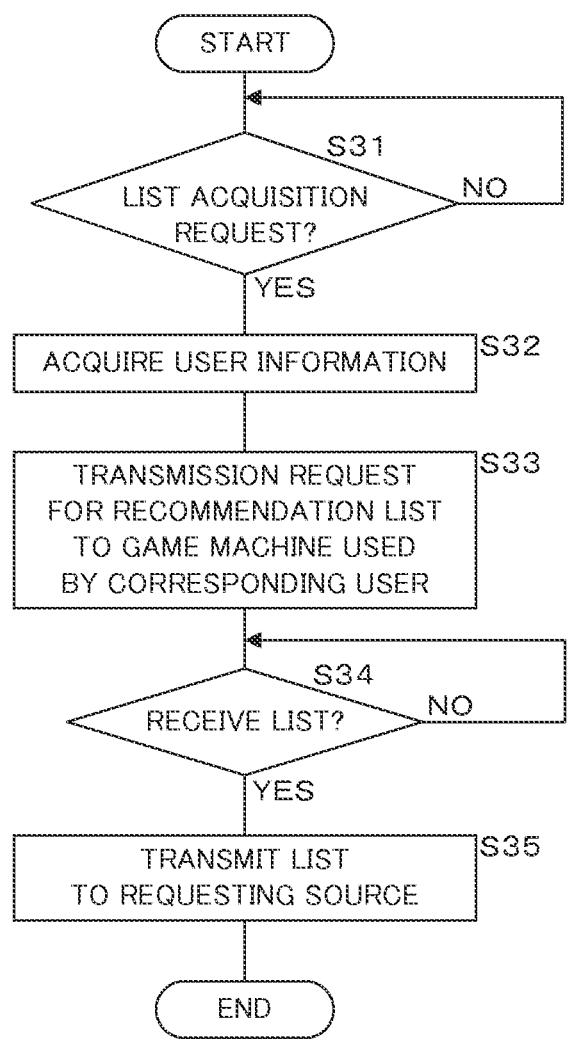
FIG. 8 is a flow chart illustrating a non-limiting example of a procedure of recommendation list transmission processing performed by a server device.

FIG. 8 is a flow chart illustrating a procedure of recommendation list transmission processing performed by the server device 3. The processing part 30 of the server device 3 judges whether a recommendation list acquisition request from the game machine 1 has been received through the communication part 33 (step S31). When a recommendation list acquisition request is not yet received (S31: NO), the processing part 30 waits until a recommendation list acquisition request is received. When a recommendation list acquisition request has been received (S31: YES), the processing part 30 acquires the user information contained in the acquisition request (step S32). The processing part 30 imparts a transmission request for the recommendation list to the game machine 1 used by the corresponding user (step S33).

The processing part 30 judges whether the recommendation list has been received from the game machine 1 (step S34). When the recommendation list is not yet received (S34: NO), the processing part 30 waits until the recommendation list is received. When the recommendation list has been received (S34: YES), the processing part 30 transmits the received recommendation list to the game machine 1 of requesting source having requested acquisition of the recommendation list (step S35) and then terminates the recommendation list transmission processing.

In the embodiment, a configuration has been employed that transmission and reception of the recommendation lists among the plurality of game machines 1 having joined the concert game is performed via the server device 3. However, employable configurations are not limited to this. That is, an alternative configuration may be employed that the plurality of game machines 1 perform direct communication with each other so as to transmit and receive the recommendation lists.

In the embodiment, the server device 3 opens, to the public, recommendation lists generated by celebrities, famous people, or the like. In the game machine 1, for example, when the item of celebrities' recommendation lists is selected in the menu screen or the like, the list acquisition processing part 23 transmits to the server device 3 an acquisition request for list information of the recommendation lists by celebrities, famous people, or the like opened to the public. The processing part 30 of the server device 3 having received the request transmits to the game machine 1 the list information of the recommendation lists by celebrities, famous people, or the like and open to the public.

The list acquisition processing part 23 of the game machine 1 having received the list information of the recommendation lists from the server device 3 displays the list information on the display part 13 through the display processing part 26 and then accepts selection of a recommendation list to be acquired. The list acquisition processing part 23 having accepted the selection transmits to the server device 3 an acquisition request for the selected recommendation list. The processing part 30 of the server device 3 having received the request reads from the storage part 31a recommendation list by the celebrity, famous people, or the like whose acquisition has been requested, and then transmits the recommendation list to the game machine 1 of requesting source. The game machine 1 having received the recommendation list from the server device 3 stores the received recommendation list into the list storage part 11b of the storage part 11. The display processing part 26 of the game machine 1 performs the processing of displaying the recommendation list on the display part 13.

<Acquisition of Musical Piece>

The user of the game machine 1 is allowed to acquire (download) from the server device 3 the data of a musical piece to be played in the game. In the embodiment, there are several methods of acquisition of musical piece data from the server device 3. For the purpose of acquisition of musical piece data, "tomatoes" owned by the user need be consumed. Thus, the user need purchase "tomatoes" in advance from the "tomato" sales server 5 or alternatively acquire "tomatoes" in advance by a method other than purchase.

For example, the musical piece data distribution part 41 of the server device 3 performs the processing of generating and opening, to the public, information such as a popularity ranking and what's-new information of musical pieces and the like. The game machine 1 acquires the information such as a popularity ranking and what's-new information opened to the public by the server device 3. Then, the display processing part 26 displays the information on the display part 13. In the game machine 1, the musical piece data acquisition processing part 22 accepts selection of a musical piece to be acquired. The musical piece data acquisition processing part 22 transmits to the server device 3 an acquisition request for the musical piece data concerning the selected musical piece. In response to this request, the musical piece data distribution part 41 of the server device 3 reads the requested musical piece data from the musical piece data storage part 31a of the storage part 31 and then transmits the data to the game machine 1 of requesting source. At that time, the musical piece data distribution part 41 checks that the number of "tomatoes" owned by the user having requested acquisition of the musical piece data is greater than or equal to the number of "tomatoes" necessary for acquisition of the musical piece data. The musical piece data distribution part 41 subtracts the number of "tomatoes" necessary for acquisition of the musical piece data from the number of "tomatoes" owned by the user, and then transmits the musical piece data. The musical piece data acquisition processing part 22 of the game machine 1 having received the musical piece data from the server device 3 stores the received musical piece data into the musical piece data storage part 11a of the storage part 11.

For example, the user is allowed to search a musical piece through the game machine 1 with specifying a condition such as the title of a musical piece and the name of an artist. When musical piece search is to be performed, the musical piece data acquisition processing part 22 of the game machine 1 transmits a musical piece search request with the specified search condition to the server device 3. In the server device 3 having received this request, the musical piece data distribution part 41 generates list information of musical pieces corresponding to the search condition and then transmits the information to the game machine 1 of requesting source. In the game machine 1 having received the list information as a search result, the display processing part 26 displays the search result on the display part 13. In the game machine 1, the musical piece data acquisition processing part 22 performs selection of a to-be-acquired musical piece in the displayed list information. The musical piece data acquisition processing part 22 transmits to the server device 3 an acquisition request for the musical piece data concerning the selected musical piece.

In the embodiment, the user is allowed to acquire musical piece data by using a recommendation list stored in the list storage part 11b of the game machine 1. For example, when the item of recommendation list display is selected in the menu screen or the like, in the game machine 1, the display processing part 26 displays onto the display part 13 a list or the like of recommendation lists stored in the list storage part 11b. In the game machine 1, the musical piece data acquisition processing part 22 accepts selection of a recommendation list to be used in acquisition of musical piece data. When any recommendation list has been selected, the musical piece data acquisition processing part 22 reads the selected recommendation list from the list storage part 11b. The display processing part 26 displays the read-out recommendation list.

Figure 9:
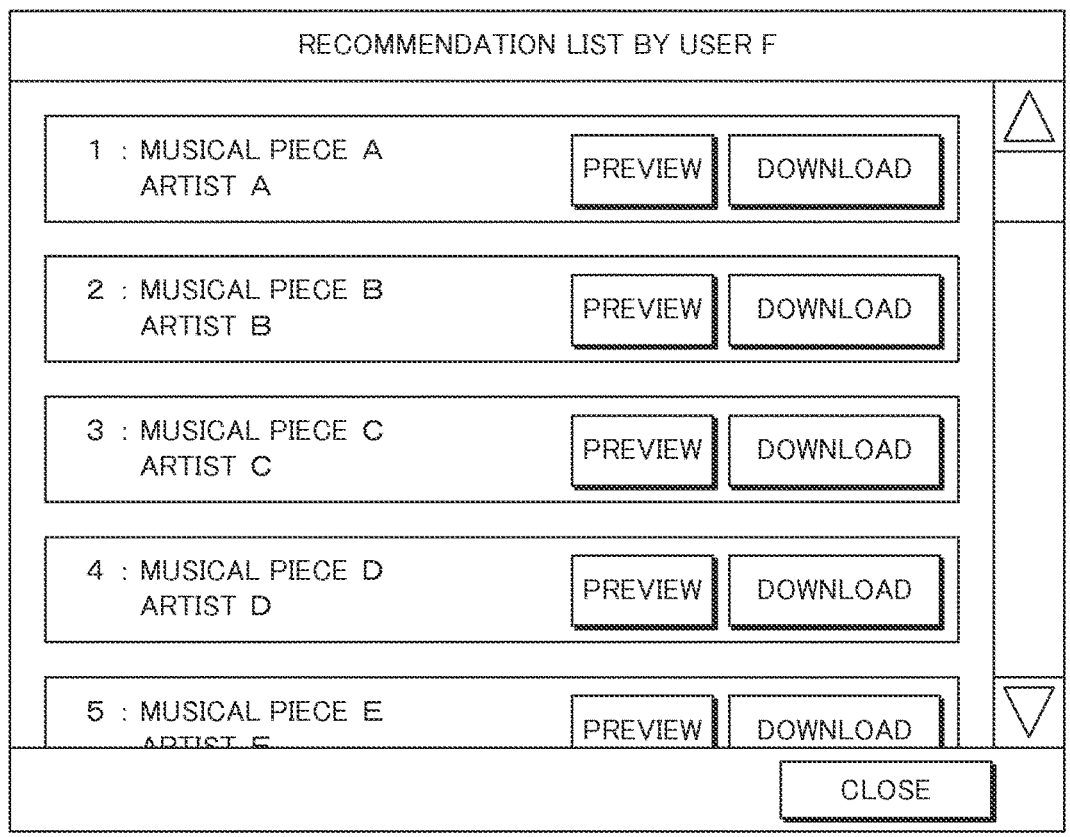
FIG. 9 is a schematic diagram illustrating a non-limiting example of display of a recommendation list.

FIG. 9 is a schematic diagram illustrating an example of display of a recommendation list. In the illustrated recommendation list display screen, a title "recommendation list by user F" is displayed in the uppermost part. Thus, the person having generated the recommendation list is allowed to be distinguished. In the lowermost part of the recommendation list display screen, a close button used for terminating the display of the recommendation list is provided. In the center part of the recommendation list display screen, regions each having an approximately rectangular shape elongated horizontally are arranged in a vertical direction.

One region is assigned to one musical piece so that recommended musical pieces are displayed in a list form.

In each of the approximately rectangular regions, information such as a musical piece name and an artist's name is displayed. In each region, a preview button used for previewing the musical piece and a download button used for acquiring the musical piece are displayed. When operation is performed on the preview button, the user is allowed to preview a part of the musical piece. In this case, for example, a preview request for the musical piece is transmitted from the game machine 1 to the server device 3. In response to this request, the server device 3 transmits preview data of the musical piece to the game machine 1. The game machine 1 having received this reproduces the musical piece. For example, the preview data of the musical piece may be obtained by extracting a part such as the beginning and the hook-line of the musical piece. The server device 3 may extract a part of the musical piece data stored in the musical piece data storage part 31*a* so as to generate preview data of the musical piece. The server device 3 may store in advance the preview data of the musical piece in the musical piece data storage part 31*a*.

When operation has been performed on the download button, the musical piece data acquisition processing part 22 of the game machine 1 transmits to the server device 3 an acquisition request for the musical piece data concerning the musical piece of operation target. In response to this request, the musical piece data distribution part 41 of the server device 3 reads the requested musical piece data from the musical piece data storage part 31*a* of the storage part 31 and then transmits the data to the game machine 1 of requesting source. The musical piece data acquisition processing part 22 of the game machine 1 having received the musical piece data from the server device 3 stores the received musical piece data into the musical piece data storage part 11*a* of the storage part 11.

When the musical piece data acquisition processing part 22 of the game machine 1 transmits to the server device 3 an acquisition request for the musical piece data based on the recommendation list, the acquisition request contains information indicating that a recommendation list has been used and information concerning the user having generated the recommendation list. By virtue of this, the "tomato" imparting part 42 of the server device 3 is allowed impart "tomatoes" to the user having generated the recommendation list in association with the acquisition of the musical piece data based on the recommendation list.

Regardless of the situation whether the recommendation list used for the acquisition of the musical piece data is one having been generated by another user having jointly played the concert game or one generated by a celebrity, famous people, or the like, acquisition of musical piece data is achievable by a similar procedure. However, in the case of acquisition request for musical piece data based on a recommendation list generated by a celebrity, famous people, or the like, imparting of "tomatoes" by the server device 3 is not performed. Thus, in this case, the acquisition request need not contain the information indicating that the recommendation list has been used and the information concerning the user or the like having generated the recommendation list.

Figure 10:
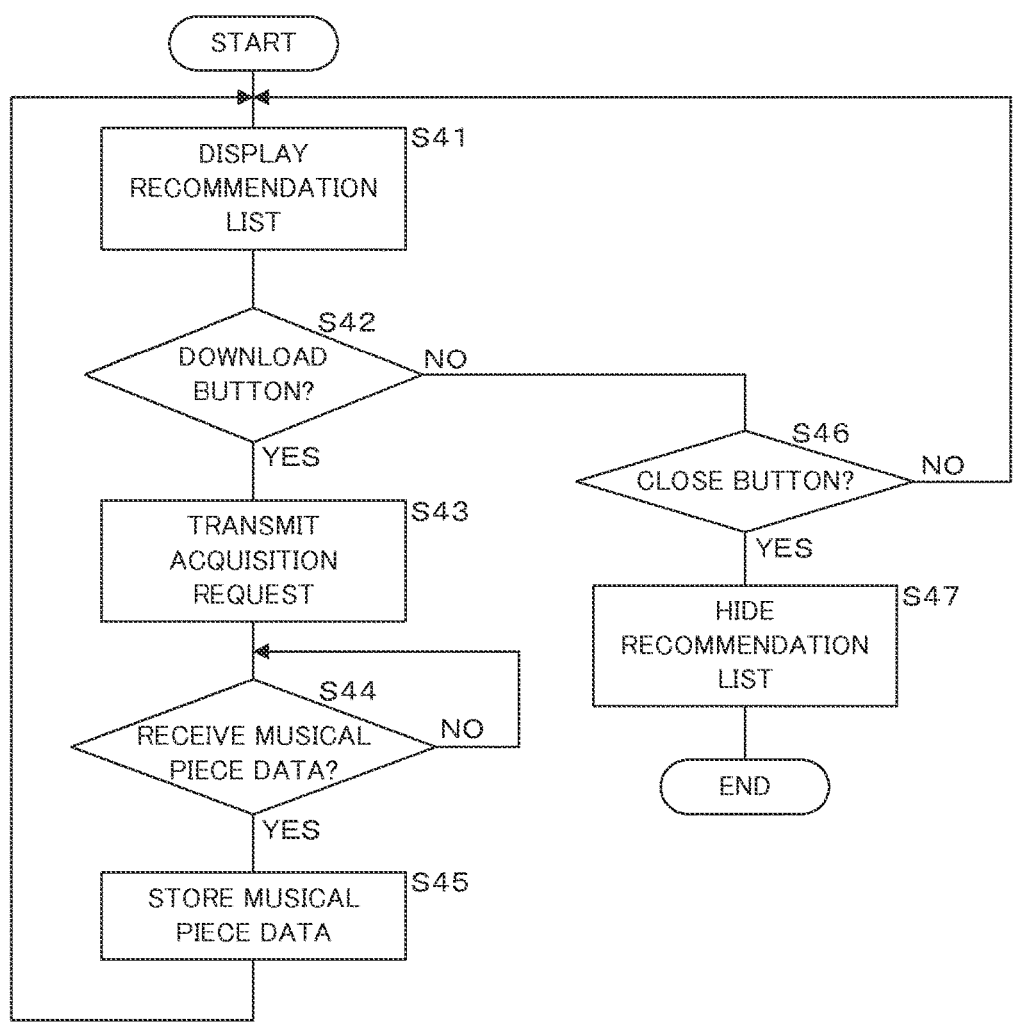
FIG. 10 is a flow chart illustrating a non-limiting example of a procedure of musical piece data acquisition request processing performed by a game machine.

FIG. 10 is a flow chart illustrating a procedure of musical piece data acquisition request processing performed by the game machine 1. In response to display operation or the like for a recommendation list performed by the user, the processing part 10 of the game machine 1 displays the recommendation list on the display part 13 (step S41). The processing part 10 judges whether operation has been performed on the download button in the recommendation list display screen (step S42). When operation has been performed on the download button (S42: YES), the musical piece data acquisition part 22 of the processing part 10 transmits an acquisition request for the musical piece data of operation target to the server device 3 (step S43).

The musical piece data acquisition part 22 judges whether the musical piece data transmitted from the server device 3 in response to the acquisition request has been received (step S44). When the musical piece data is not yet received (S44: NO), the musical piece data acquisition part 22 waits until the musical piece data is received. When the musical piece data has been received (S44: YES), the musical piece data acquisition part 22 stores the received musical piece data into the musical piece data storage part 11*a* of the storage part 11 (step S45) and then returns the processing to step S41.

When the download button is not yet operated in the recommendation list display screen (S42: NO), the processing part 10 judges whether operation has been performed on the close button (step S46). When operation is not yet performed on the close button (S46: NO), the processing part 10 returns the processing to step S41 so as to continue displaying the recommendation list. When operation has been performed on the close button (S46: YES), the processing part 10 hides the recommendation list (step S47) and then terminates the musical piece data acquisition request processing.

When the musical piece data is acquired by whichever method, for the purpose of acquisition of musical piece data, "tomatoes" owned by the user need be consumed. In response to the musical piece data acquisition request from the game machine 1, the musical piece data distribution part 41 of the server device 3 judges whether the user having performed the acquisition request owns "tomatoes" in a number necessary for acquisition of the musical piece data. When the user does not own necessary "tomatoes", the musical piece data distribution part 41 transmits to the game machine 1 of requesting source a notification that the "tomatoes" are insufficient, and then does not transmit the musical piece data. When the user owns necessary "tomatoes", the musical piece data distribution part 41 subtracts the necessary number from the number of "tomatoes" owned by the users, and then transmits the requested musical piece data to the game machine 1. However, in a case that there are some musical pieces to be provided for free, consumption of "tomatoes" is unnecessary in acquisition of such musical piece data.

The user is allowed to generate, edit, or the like an own recommendation list in the game machine 1. For example, when the item of recommendation list generation is selected in the menu screen or the like, the list generation processing part 24 of the game machine 1 causes the display processing part 26 to display a recommendation list generation screen on the display part 13. The list generation processing part 24 accepts operation of generation, editing, or the like of the recommendation list through the operation part 14. The list generation processing part 24 performs list display of the musical piece data stored, for example, in the musical piece data storage part 11*a* of the storage part 11. The list generation processing part 24 is allowed to accept selection of a musical piece data to be registered into the recommendation list from the displayed musical piece data. Further, a configuration may be employed that a musical piece not yet acquired is allowed to be registered into the recommendation list. In this case, for example, a configuration may be employed that at the time that list information or the like of distributed musical pieces is acquired from the server device 3 and then displayed on the display part 13, an icon or the like for each musical piece used for adding to the recommendation list is displayed and then the list generation processing part 24 accepts add operation to the recommendation list of musical pieces. The list generation processing part 24 stores the generated or edited recommendation list into the list storage part 11b of the storage part 11.

<Imparting of "Tomatoes">

The "tomatoes" necessary for acquisition of musical piece data is allowed to be purchased when the game machine 1 performs communication with the "tomato" sales server 5. For example, when the item of "tomato" purchase is selected in the menu screen or the like, the game machine 1 performs communication with the "tomato" sales server 5 through the communication part 15 and then displays a "tomato" purchase screen on the display part 13 through the display processing part 26. Although not illustrated, in the "tomato" purchase screen, information such as the number of "tomatoes" to be purchased, a payment method, and the like is allowed to be inputted. On completion of information input, a purchase request is transmitted from the game machine 1 to the "tomato" sales server 5. In response to the purchase request from the game machine 1, the "tomato" sales server 5 judges the success or failure of the information concerning the payment method and the like. In case of success, the "tomato" sales server 5 imparts "tomatoes" to the user having performed the purchase request. At that time, the "tomato" sales server 5 transmits to the server device 3 the information concerning the user having purchased the "tomatoes" and the information such as the purchase quantity and the term of validity. The "tomato" imparting part 42 of the server device 3 having received such information updates the information stored in the "tomato" administration information storage part 31b of the storage part 31, so as to impart "tomatoes" to the user.

In the embodiment, the "tomato" imparting part 42 of the server device 3 performs the processing of imparting "tomatoes" for free to a user who satisfies a given imparting condition. As described above, in the embodiment, recommendation lists are allowed to be delivered and received among the plurality of users having jointly performed the concert game. Each user is allowed to acquire musical piece data by using the acquired recommendation list. When acquisition of the musical piece data has been performed by the game machine 1, the "tomato" imparting part 42 of the server device 3 judges whether the acquisition has been based on a recommendation list. The "tomato" imparting part 42 stores the number of times of use of a recommendation list for each user. When a recommendation list is used by another user, the "tomato" imparting part 42 increases the stored number of times for the user having generated the recommendation list. When the number of times of use of the recommendation list exceeds, for example, a threshold such as 10 times and 100 times, the "tomato" imparting part 42 imparts a given number of "tomatoes" to the user having generated the recommendation list. After imparting the "tomatoes" to the user, the "tomato" imparting part 42 initializes the number of times of use or alternatively sets forth a higher threshold.

When acquisition of the musical piece data has been performed by using a recommendation list generated by a celebrity, famous people, or the like having been acquired without joining a concert game, the "tomato" imparting part 42 does not impart "tomatoes" to the user having generated the recommendation list.

Figure 11:
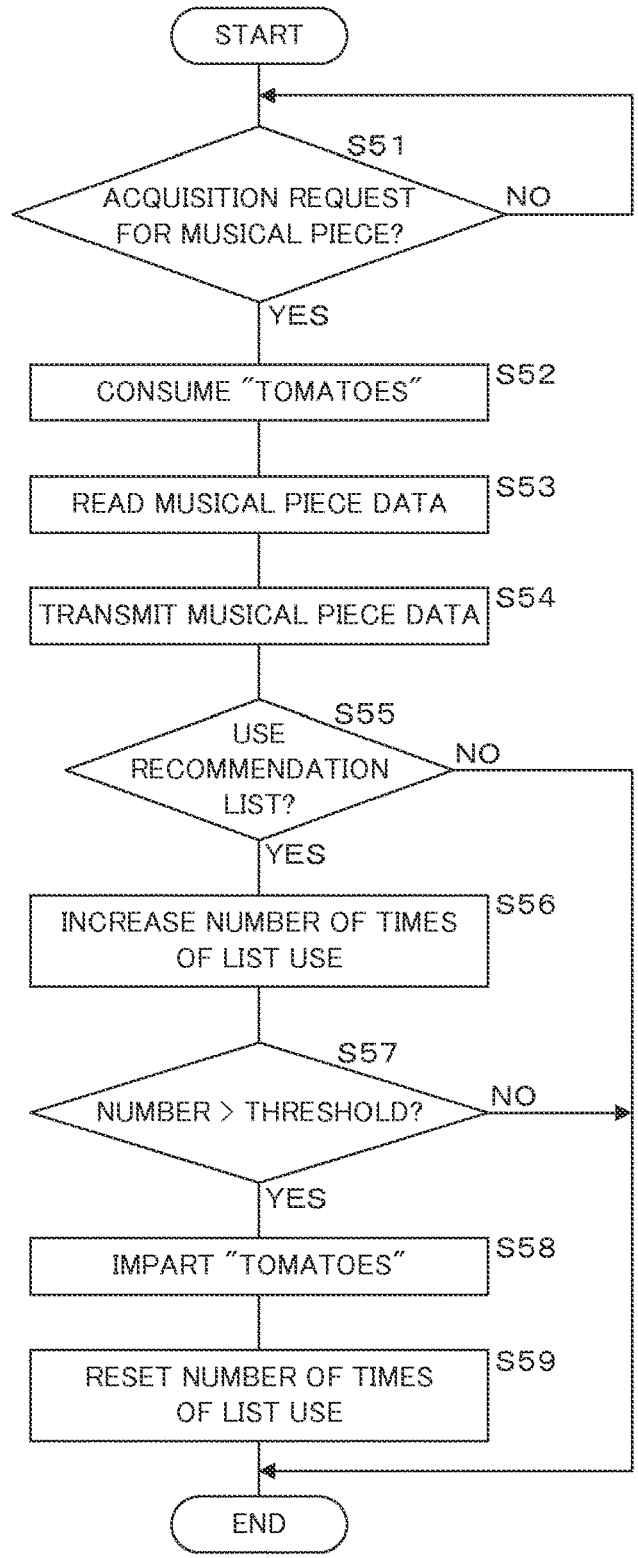
FIG. 11 is a flow chart illustrating a non-limiting example of a processing procedure of musical piece data transmission and "tomato" imparting performed by a server device.

FIG. 11 is a flow chart illustrating a processing procedure of musical piece data transmission and "tomato" imparting performed by the server device 3. The musical piece data distribution part 41 of the server device 3 judges whether an acquisition request for a musical piece data has been received from the game machine 1 (step S51). When an acquisition request is not yet received (S51: NO), the musical piece data distribution part 41 waits until an acquisition request is received. When an acquisition request for a musical piece data has been received (S51: YES), the musical piece data distribution part 41 causes the "tomatoes" owned by the user having performed the acquisition request to be consumed by a number necessary for acquisition of the musical piece data (step S52). Although not illustrated, when the user does not own the necessary number of "tomatoes", the musical piece data distribution part 41 suspends the processing and then notifies the situation to the game machine 1. The musical piece data distribution part 41 reads from the musical piece data storage part 31a the musical piece data concerning the acquisition request (step S53). The musical piece data distribution part 41 transmits the read-out musical piece data to the game machine 1 of requesting source (step S54).

The "tomato" imparting part 42 of the processing part 30 judges whether the acquisition request for the musical piece data has been transmitted from the game machine 1 by using the recommendation list (step S55). The acquisition request for the musical piece data transmitted from the game machine 1 contains information indicating whether the acquisition request is based on a recommendation list and, when this is the case, information indicating a user having generated the recommendation list. The "tomato" imparting part 42 checks the information contained in the acquisition request transmitted from the game machine 1 so as to be allowed to judge whether the acquisition request is based on a recommendation list. When the acquisition request is not based on a recommendation list (S55: NO), the "tomato" imparting part 42 terminates the processing.

When the acquisition request from the game machine 1 is based on a recommendation list (S55: YES), the "tomato" imparting part 42 increases the number of times of use of the recommendation list stores as the information concerning the user having generated the recommendation list (step S56). The "tomato" imparting part 42 judges whether the number of times of use of the recommendation list exceeds a given threshold (step S57). When the number of times of use does not exceed the threshold (S57: NO), the "tomato" imparting part 42 terminates the processing. When the number of times of use exceeds the threshold (S57: YES), the "tomato" imparting part 42 imparts "tomatoes" to a person having generated the recommendation list (step S58). The "tomato" imparting part 42 resets the number of times of use of the recommendation list stored in correspondence to the user (step S59) and then terminates the processing.

Here, determination of whether "tomatoes" are to be imparted may be performed at certain intervals. For example, determination of whether "tomatoes" are to be imparted may be performed at a frequency such as once a month on the basis of the total number of times of use of the list.

In the server device 3, the game administration part 44 calculates an accumulation of the marks obtained by each user in the concert game and then the storage part 31 stores the data as the achievement of each user. For example, the game administration part 44 of the server device 3 compares the achievements of the individual users with each other on the final day or the like of each month and then opens to the public a ranking of high-achievement users. The "tomato" imparting part 42 of the server device 3 imparts "tomatoes" in a number corresponding to the ranking, to the higher-rank winners of the achievement ranking.

In the server device 3, the game administration part 44 counts the number of times of joining the concert game by each user. Then, the storage part 31 stores the number of times of joining by each user. For example, together with the above-mentioned achievement ranking, the game administration part 44 of the server device 3 opens to the public the ranking of the number of times of joining by users. The "tomato" imparting part 42 of the server device 3 imparts "tomatoes" in a number corresponding to the ranking, to the higher-rank winners of the ranking of the number of times of joining.

The user is allowed to generate a musical piece in the game machine 1. For example, when the item of musical piece generation is selected in the menu screen or the like, the musical piece generation processing part 25 of the game machine 1 causes the display processing part 26 to display a musical piece generation screen on the display part 13. The musical piece generation processing part 25 accepts, through the operation part 14, musical piece generation operation such as arrangement of musical notes in a musical score. The musical piece generation processing part 25 stores the musical piece data of the generated musical piece into the musical piece data storage part 11a of the storage part 11. The musical piece generation processing part 25 is allowed to read the musical piece data stored in the musical piece data storage part 11a and then accept editing operation onto the musical piece. However, musical piece data allowed to be edited may be limited to those generated by the user oneself.

Here, the server device 3 need not indispensably open the above-mentioned ranking to the public. The server device 3 may not open the ranking to the public and may use the aggregation of the achievement in the game or the number of times of joining as internal processing so that "tomatoes" may be imparted on the basis of the aggregation result.

The user is allowed to submit to the server device 3 the musical piece generated in the game machine 1 so as to open the musical piece to other users. For example, when the item of musical piece submission is selected in the menu screen or the like, the musical piece generation processing part 25 of the game machine 1 performs list display of musical piece data generated by the game machine 1 among the musical piece data stored in the musical piece data storage part 11a. The musical piece generation processing part accepts selection of a musical piece to be submitted. The musical piece generation processing part 25 transmits the musical piece data of the selected musical piece to the server device 3 through the communication part 15 so as to submit the musical piece.

The submission of the musical piece from the game machine 1 is received by the submission reception part 43 of the server device 3. The submission reception part 43 stores the musical piece data received from the game machine 1 through the communication part 33, into the musical piece data storage part 31a of the storage part 31 so as to add the data to the distribution objects of the musical piece data distribution part 41. The musical piece data distribution part 41 opens the musical piece data received as a submission by the submission reception part 43 and then stored into the musical piece data storage part 31a, to the public as a newly arriving musical piece or the like.

When the musical piece data generated and submitted by the user and then opened to the public by the server device 3 is acquired by another user, the "tomato" imparting part 42 of the server device 3 imparts "tomatoes" to the user having generated the musical piece. For example, the "tomato" imparting part 42 counts the number of times of acquisition of each musical piece. When the counted number of times exceeds a threshold such as 10 times and 100 times, the "tomato" imparting part 42 imparts a given number of "tomatoes" to the user having generated the musical piece. After imparting the "tomatoes" to the user, the "tomato" imparting part 42 initializes the number of times of acquisition of the musical piece or alternatively sets forth a higher threshold.

The condition of imparting "tomatoes" to the user by the "tomato" imparting part 42 is not limited to that described in the embodiment. The "tomato" imparting part 42 may impart "tomatoes" to the user in accordance with various imparting conditions other than the above-mentioned one.

<"Tomato" Check Screen>

The user is allowed to acquire musical piece data from the server device 3 with consuming the own "tomatoes". When a given imparting condition is satisfied, "tomatoes" are imparted from the server device 3 to the user. The information concerning the "tomatoes" owned by the user is stored in the "tomato" administration information storage part 31b of the server device 3. FIG. 12 is a schematic diagram illustrating an example of "tomato" administration information stored in the server device 3. The server device 3 stores the user ID identifying each user, the number of "tomatoes" owned by the user, the term of validity of the "tomatoes", and the acquisition factor of the "tomatoes" in a manner of being in correspondence to each other as "tomato" administration information. The acquisition factor is information indicating a method by which the "tomatoes" have been acquired by the user.

In the illustrated example, it is recorded that 29 "tomatoes" owned by a user A have the term of validity to the end of September, 2013 and have been acquired by purchase from the "tomato" sales server. It is recorded that 50 "tomatoes" owned by the user A have the term of validity to the end of December, 2013 and have been imparted for free by the server device 3 when a given imparting condition has been satisfied. In the embodiment, it is premised that the acquisition factor in the "tomato" administration information is any one of purchase and imparting. However, the acquisition factor of imparting to be recorded may be divided in further detail into imparting by recommendation list use, imparting by ranking win, imparting by musical piece submission, and the like. Further, in the illustrated example, it is recorded that two "tomatoes" owned by the user A has expired. However, information concerning expired "tomatoes" may be not stored.

The user is allowed to check the information such as the number and the term of validity of "tomatoes" owned by oneself in the game machine 1. For example, when the item of "tomato" check is selected in the menu screen, together with information such as the user ID, the processing part 10 of the game machine 1 transmits an acquisition request for the "tomato" administration information to the server device 3. When the acquisition request for "tomato" administration information has been received from the game machine 1, the server device 3 read from the "tomato" administration information storage part 31b the "tomato" administration information corresponding to the user ID contained in the acquisition request, and then transmits the information to the game machine 1 of requesting source. In the processing part 10 of the game machine 1, the "tomato" administration information from the server device 3 is received through the communication part 15. On the basis of the received "tomato" administration information, the processing part 10 causes the display processing part 26 to display a "tomato" check screen on the display part 13.

FIG. 13 is a schematic diagram illustrating an example of the "tomato" check screen. In the illustrated "tomato" check screen, a title "tomato check screen" is displayed in the uppermost part. In the "tomato" check screen, a close button used for accepting display end operation for the "tomato" check screen is provided in the lowermost part. In the center part of the "tomato" check screen, information concerning the "tomatoes" owned by the user is displayed. In the illustrated "tomato" check screen, an icon imitating the external appearance of a tomato, the term of validity of the "tomatoes", and the number of owned "tomatoes" are displayed in a manner of being in correspondence to each other in the horizontal direction. The information concerning "tomatoes" is displayed and arranged from the top to the bottom in the ascending order of remaining term of validity. The information concerning the expired "tomatoes" is displayed at the end with being partitioned by a partition line.

In the embodiment, in the game machine 1, in the icons respectively attached to the information concerning the "tomatoes", mutually different images are used in correspondence to the term of validity of the "tomatoes". For example, the game machine 1 displays an icon of a fresh tomato for "tomatoes" whose remaining term of validity is one month or longer. The game machine 1 displays an icon of a half-rotten tomato for "tomatoes" whose remaining term of validity is less than one month. The game machine 1 displays an icon of a rotten tomato for expired "tomatoes".

When certain "tomatoes" have been imparted for free by the server device 3, the game machine 1 displays an asterisk on a side of the number of owned "tomatoes" in the "tomato" check screen. However, whether "tomatoes" have been imparted for free need not indispensably be distinguished. A configuration may be employed that such an asterisk is not displayed in the "tomato" check screen. When the imparting factor of "tomatoes" is to be displayed in further detail, the game machine 1 may display mutually different marks in correspondence to individual imparting factors.

CONCLUSION

In the information processing system according to the embodiment, the server device 3 distributes musical piece data as contents through the network 99 to the game machine 1. The user acquires musical piece data from the server device 3 in the game machine 1 in association with value reduction of "tomatoes" serving as value information owned by oneself. The user is allowed to perform a game of playing a musical piece by using the acquired musical piece data. When a plurality of the game machines 1 perform communication through the network 99, the plurality of users are allowed to perform a concert game of jointly playing the musical piece. When a given imparting condition has been satisfied in association with performance of the concert game, the "tomato" imparting part 42 of the server device 3 imparts "tomatoes" to the users having joined the concert game.

By virtue of this, "tomatoes" necessary for acquisition of musical piece data are allowed to be imparted to the users having joined the concert game. This promotes the users to join the concert game and to use the information processing system.

In the embodiment, in association with the concert game being performed by the plurality of game machines 1, each game machine 1 is allowed to acquire recommendation lists from the other game machines 1. On completion of the concert game, the game machines 1 perform a job-well-done party as an occasion of information exchange. At that time, each users having joined the concert game is allowed to acquire recommendation lists by the other users. Imparting of "tomatoes" performed by the "tomato" imparting part 42 of the server device 3 is performed with adopting as an imparting condition at least a fact that the game machine 1 performs processing on the basis of an acquired recommendation list. The "tomato" imparting part 42 adopts as a "tomato" imparting condition at least a fact that the game machine 1 performs acquisition of musical piece data by using a recommendation list.

With adopting as an imparting condition a fact that processing based on a recommendation list is performed by the game machine 1, the "tomato" imparting part 42 of the server device 3 imparts "tomatoes" to the user of the game machine 1 having provided the recommendation list. That is, with adopting as an imparting condition a fact that acquisition of musical piece data by using a recommendation list is performed in the game machine 1, the "tomato" imparting part 42 of the server device 3 imparts "tomatoes" to the user having generated the recommendation list having been used. The game machine 1 accepts, through the list generation processing part 24, generation of a recommendation list in which one or a plurality of user's favorite musical pieces are registered. The list generation processing part 24 stores the generated list into the list storage part 11*b* of the storage part 11. The recommendation list generated in the list generation processing part 24 is allowed to be acquired from the other users at the time of the job-well-done party of the concert game.

By virtue of these, in addition to performing the concert game, the users are allowed to recommend favorite musical pieces to other users. Thus, the information processing system according to the embodiment is allowed to provide, to the users, pleasure other than acquiring musical piece data and then performing a game, and hence allowed to promote the users to use the information processing system.

In the embodiment, the server device 3 opens, to the public, recommendation lists by celebrities, famous people, or the like. The list acquisition processing part 23 of the game machine 1 is allowed to acquire these recommendation lists. That is, the user is allowed to acquire through the game machine 1 a recommendation list by a user not having jointly performed the concert game and then use the recommendation list for acquisition of musical piece data. When such recommendation lists are opened to the public, utilization of the system is allowed to be promoted further.

However, if "tomatoes" were imparted the users having generated such recommendation lists, a possibility could be arise that a large number of "tomatoes" are imparted to users such as celebrities, famous people, or the like. Thus, in the embodiment, even when a recommendation list is used, "tomatoes" are not imparted to the user having generated the recommendation list which is allowed to be acquired without joining the concert game.

In the embodiment, at the time of a job-well-done party of a concert game when acquisition of a recommendation list is performed, the game machine 1 displays information concerning the users having jointly performed the concert game. By virtue of this, each user is allowed to check the information concerning other users and then determined whether recommendation lists are to be acquired. This improves convenience in the utilization of the system.

In the embodiment, when a given condition is satisfied like a user becomes a higher-rank winner in a ranking of the achievement calculated as a result of a concert game, the "tomato" imparting part 42 of the server device 3 imparts "tomatoes" to the user. This enhances the pleasure of joining the concert game, the pleasure of progress in the concert game, and the like. As for the result of the concert game, in place of the individual personal achievement of each user having joined the concert game, an achievement common to all users having joined the concert game is calculated, then added for each user, and then used for the aggregation of a ranking. This increases a possibility that even a beginner becomes a higher-rank winner in the ranking. This avoids a situation that higher-rank winners in the ranking are fixed so that imparting of "tomatoes" is concentrated on particular users.

When a given condition is satisfied like a user becomes a higher-rank winner in a ranking of the number of times (the frequency) of joining the concert game, the "tomato" imparting part 42 imparts "tomatoes" to the user. This promotes the users to join the concert game.

In the embodiment, the musical piece generation processing part 25 of the game machine 1 is allowed to accept generation of a musical piece and then submit the generated musical piece data to the server device. The submission reception part 43 of the server device 3 receives the submission of the musical piece data from the game machine 1 and then opens the data to the public. Other users are allowed to acquire through the individual game machines 1 the musical piece data opened to the public. With adopting as a condition a fact that the submitted musical piece data has been acquired by another user, the "tomato" imparting part 42 of the server device 3 imparts "tomatoes" to the user having generated the musical piece data. By virtue of this, the user having generated an excellent musical piece is allowed to be rewarded so that the number of musical pieces distributed by the server device 3 is allowed to be increased.

In the embodiment, value information having a name "tomato" and necessary for acquisition of contents is imparted to the user. The tomato is an article of perishable foods whose state varies with advancement of time like a fresh tomato, a half-rotten tomato, and a rotten tomato. Such a name is suitable for value information having the term of validity. When such a name is employed for value information, the remaining term of validity of value information is allowed to be brought into correspondence to a state change in the article. For example, when the term of validity of value information is to be notified to the user, an image imitating the external appearance of the article may be displayed and then the external appearance of the article may be changed in correspondence to the term of validity. This allows the user to easily and reliably recognize the term of validity of value information.

Here, in the embodiment, a configuration has been employed that distribution processing for musical piece data and "tomatoes" imparting processing for the user are performed by one server device 3. However, employable configurations are not limited to this. That is, an alternative configuration may be employed that the distribution processing and the imparting processing are performed by separate server devices. A configuration has been employed that musical piece data to be distributed is stored in the musical piece data storage part 31a of the storage part 31 of the server device 3. However, employable configurations are not limited to this. For example, the musical piece data may be stored in a storage device separate from the server device 3. The server device 3 may have a configuration that musical piece data is acquired from the storage device and then transmitted to the game machine 1. A configuration has been employed that "tomato" sales processing is performed by the "tomato" sales server 5. However, employable configurations are not limited to this. For example, the server device 3 may perform the "tomato" sales processing. A configuration has been employed that the recommendation list generated by each user is stored in the list storage part 11b of the storage part 11 of the game machine 1. However, employable configurations are not limited to this. For example, an alternative configuration may be employed that the server device 3 stores the recommendation lists by the individual user.

A configuration has been employed that the server device 3 administers the concert game. However, employable configurations are not limited to this. For example, an alternative configuration may be employed that the plurality of game machines 1 perform the concert game without the intervention of the server device 3. A configuration has been employed that when a recommendation list is to be acquired from another game machine 1 the game machine 1 acquires the recommendation list via the server device 3. However, employable configurations are not limited to this. For example, an alternative configuration may be employed that the game machine 1 and other game machines perform direct communication with each other so as to deliver and receive the recommendation list.

The value information to be imparted to the user has been named "tomato". However, employable configurations are not limited to this. The value information may have the name of another article whose state varies with advancement of time. For example, the value information may have a name "cucumber", "carrot", "potato", the name of a perishable food such as meat, fish, and fruit, or the name of a dairy product or confectionery. The value information may be named a coin, gold, or a point.

The processing procedure and the like of the game machine 1 and the server device 3 illustrated in the embodiment are exemplary and non-limiting. The displayed screens illustrated in FIGS. 5, 9, and 13 are exemplary and non-limiting. The configuration of the "tomato" administration information illustrated in FIG. 12 is exemplary and non-limiting.

The embodiment has been described with employing the game machine 1 as an example of the information processing device. However, employable configurations are not limited to this. For example, a similar technique may be applied to an information processing device of diverse kind such as a general purpose computer, a tablet type terminal unit, and a portable telephone. The information processing performed by the information processing device is not limited to a game. A play-solo/play-in-concert game has been employed as an example of a game performed by the game machine 1. However, this configuration is exemplary and non-limiting. That is, a similar configuration may be applied to any other game of diverse kind. The device configuration of the information processing system and the assignment of the roles of the individual devices are not limited to those described in the embodiment. For example, at least a part of the functions of the game machine 1 described in the embodiment may be moved to the server device 3. On the contrary, at least a part of the functions of the server device 3 may have moved to the game machine 1.

In addition to a system distributing contents such as musical piece data, the technique may be applied to any other information processing system of diverse kind. A configuration that when a plurality of users have jointly performed any information processing, value information such as "tomatoes" is imparted may be applied to such an information processing system of diverse kind. For example, in addition to a processing that "tomatoes" are imparted to the user having generated a recommendation list, "tomatoes" may be imparted to a user having simply joined the concert game or alternatively to a user having obtained an achievement higher than or equal to a fixed value jointly or independently in the concert game. In this case, when the user actively joins the concert game or plays the concert game better, "tomatoes" are imparted to the user regardless of the status of utilization of the recommendation list generated by oneself. This improves the motivation for playing the concert game itself.

In the embodiment, a configuration has been employed that the server device 3 imparts "tomatoes". However, employable configurations are not limited to this. For example, an alternative configuration may be employed that when the plurality of game machines 1 are allowed to perform direct communication with each other through the Internet, a wireless communication, or the like without the intervention of the server device 3, any one of the game machines 1 imparts own "tomatoes" to another game machine 1. Further, an alternative configuration may be employed that even when communication is performed via the server device 3, any one of the game machines 1 imparts own "tomatoes" to another game machine 1 via the server device 3. For example, a configuration may be employed that the processing of imparting "tomatoes" is performed jointly in a distributed manner by the plurality of game machines 1. Here, in these cases, the game machine 1 on the "tomato" imparting side transmits data or the like indicating the number of "tomatoes" to be imparted, to another game machine 1 via the server device 3 or alternatively through the general Internet. The game machine 1 on the imparting side subtracts the number of to-be-imparted "tomatoes" from the number of "tomatoes" stored in the own storage part. In contrast, said another game machine 1 performs the processing of increasing by the number of imparted "tomatoes" the number of "tomatoes" owned by said another game machine 1 stored in the storage part of said another game machine 1.

The imparting of "tomatoes" performed by the "tomato" imparting part 42 of the server device 3 may be performed in accordance with a condition other than the condition described in the embodiment. For example, an alternative configuration may be employed that the "tomato" imparting part 42 imparts "tomatoes" to the users having joined the concert game with adopting as a condition the joining alone of the concert game. For example, a configuration may be employed that the "tomato" imparting part 42 imparts "tomatoes" in accordance with the condition described in the following modification.

MODIFICATION

In an information processing system according to a modification, one of the users of the game machines 1 requests holding of a concert game to the server device 3 with consuming a given number of "tomatoes" owned by oneself. At that time, the user serving as the host is allowed to specify a condition for users to be allowed to join the concert game. For example, a configuration may be employed that when a level indicating the amount of experience or the like in the game is set forth as a numerical value for each user, the condition may be set forth such that only users at levels higher than or equal to a certain numerical value are allowed to join. Here, the server device 3 may increase or decrease the number of "tomatoes" necessary for holding of the concert game in correspondence to a specified condition.

The server device 3 extracts other users who satisfy the specified condition, as members of the concert game and then performs the concert game. On completion of the concert game, the server device 3 distributes the given number of "tomatoes" consumed for holding the concert game, to the users other than the user having held the concert game. At that time, the server device 3 may increase or decrease the number of "tomatoes" to be distributed to each user, for example, in accordance with the personal achievement or the like in the concert game.

As such, in the information processing system according to the modification, at least one user holds a concert game with consuming "tomatoes", and then imparts "tomatoes" to other users having joined. Thus, for example, even a user at a low level is allowed to perform the concert game with gathering high-level users. For example, in a system in which a plurality of users jointly perform a role playing game, for the purpose of defeating a mighty enemy, a user at a low level is allowed to request cooperation to high-level users with providing value information.

According to the technique, it is expected to promote utilization of the system to a larger number of users.

In the specification, it is to be recognized that an element or the like described as a singular number with attaching an article "a" or "an" is actually not limited to a singular number and may be in a plural number.

What is claimed is:

1. An information processing system including a plurality of information processing devices and configured to promote users to join the system, the information processing system comprising:
   a processing system having at least one processor, the processing system configured to:
      perform information processing in accordance with a video game cooperatively played between a plurality of players, associated with the plurality of information processing device, through a network, the video game configured for playing a musical piece, between the plurality of players, from musical piece data generated by at least one player;
      determine if a first imparting condition has been satisfied based on a frequency associated with obtaining one or more pieces of the musical piece data in the video game and impart value information to a user associated with creating the one or more pieces of the musical piece data when the first imparting condition has been satisfied; and
      determine if a second imparting condition has been satisfied based on one or more pieces of the musical piece data obtained in association with a recommendation list and impart value information to a user associated with generating the recommendation list when the second imparting condition has been satisfied.

2. The information processing system according to claim 1, further comprising a server device, wherein the server device is configured to impart the value information to the user.

3. The information processing system according to claim 2, wherein the server device is configured to receive submission of contents from at least one of the information processing devices, and wherein each of the plurality of information processing devices is configured to acquire the contents with a consumption of the value information, and wherein on the basis of acquisition of the contents, the submission of which has been received by the server device, the value information is imparted to the user having submitted the contents.

4. The information processing system according to claim 1, wherein the value information is imparted to a user of a first information processing device in accordance with consumption of the value information performed by a user of a second information processing device.

5. The information processing system according to claim 1, wherein the processing circuitry is further configured to distribute contents through the network, wherein each of the plurality of information processing devices is configured to acquire the contents with a consumption of the value information.

6. The information processing system according to claim 5, wherein each of the plurality of information processing devices is configured to acquire, in accordance with the performed information processing, given information from another information processing device having jointly performed the information processing, and wherein with adopting as the first and second imparting conditions at least that one of the information processing devices performs processing on the basis of the acquired given information, the value information is imparted to said another information processing device, and wherein when the contents corresponding to the given information are acquired, the value information is imparted to the user of said another information processing device from which the given information has been acquired.

7. The information processing system according to claim 1, wherein each of the plurality of information processing devices is configured to acquire, in accordance with the performed information processing, given information from another information processing device having jointly performed the information processing, and wherein with adopting as the first and second imparting conditions at least that one of the information processing devices performs processing on the basis of the acquired given information, the value information is imparted to said another information processing device.

8. The information processing system according to claim 7, wherein the value information is imparted to the user of said another information processing device from which the given information is acquired by said one of the information processing devices.

9. The information processing system according to claim 7, wherein each of the plurality of information processing devices is configured to accept operation of generating the given information, wherein the given information generated on the basis of the accepted operation is imparted to said another information processing device.

10. The information processing system according to claim 7, wherein each of the plurality of information processing devices is configured to acquire the given information concerning a user who does not jointly perform the information processing, and wherein the value information is not imparted to the user concerning the acquired given information.

11. The information processing system according to claim 7, wherein the given information is a list of contents.

12. The information processing system according to claim 1, wherein each of the plurality of information processing devices is configured to perform processing of displaying information concerning the user of another information processing device having jointly performed the information processing.

13. The information processing system according to claim 1, wherein when a plurality of the information processing devices are to jointly perform the information processing, value reduction is performed on the value information owned by a user of at least one information processing device.

14. The information processing system according to claim 1, wherein a term of validity is set in the value information, and each of the plurality of information processing devices is configured to display an image that imitates an article whose state varies with advancement of time and thereby making a notice of the term of validity for the value information.

15. The information processing system according to claim 1, wherein the recommendation list is exchanged among the plurality of players cooperatively playing the video game.

16. The information processing system according to claim 1, wherein a frequency of each player joining the cooperative play of the game is aggregated and ranked and the value information is imparted based on the ranking.

17. An information processing system including a server device and a plurality of information processing devices and configured to promote users to join the system, the information processing system comprising:

a processing system having at least one processor, the processing system configured to:

determine if a first imparting condition has been satisfied based on a frequency associated with obtaining one or more pieces of musical piece data in a video game cooperatively played between a plurality of players playing a musical piece and impart value information to a user associated with creating the one or more pieces of the musical piece data when the first imparting condition has been satisfied; and determine if a second imparting condition has been satisfied based on one or more pieces of the musical piece data obtained in association with a recommendation list and impart value information to a user associated with generating the recommendation list when the second imparting condition has been satisfied, wherein the value information has a term of validity having been set and is displayed with an image imitating an article whose state varies with advancement of time or provided with a name of an article whose state varies with advancement of time.

18. The information processing system according to claim 17, wherein each of the plurality of information processing devices is configured to display an image that imitates an article whose appearance varies with advancement of time and thereby makes a notice of the term of validity for the value information.

19. A server device, comprising:
a processing system having at least one processor, the processing system configured to:
   determine if a first imparting condition has been satisfied based on a frequency associated with obtaining one or more pieces of musical piece data in a video game, cooperatively played between a plurality of players playing a musical piece, included in information processing of an information processing device and impart value information to a user associated with creating the one or more pieces of the musical piece data when the first imparting condition has been satisfied; and
   determine if a second imparting condition has been satisfied based on one or more pieces of the musical piece data obtained in association with a recommendation list and impart value information to a user associated with generating the recommendation list when the second imparting condition has been satisfied.

20. A non-transitory recording medium storing a server program in a memory of a server device which, when executed by a processor of the server device, causes the server device to perform execution comprising:
   determine if a first imparting condition has been satisfied based on a frequency associated with obtaining one or more pieces of musical piece data in a video game, cooperatively played between a plurality of players playing a musical piece, included in information processing of an information processing device and impart value information to a user associated with creating the one or more pieces of the musical piece data when the first imparting condition has been satisfied; and
   determine if a second imparting condition has been satisfied based on one or more pieces of the musical piece data obtained in association with a recommendation list and impart value information to a user associated with generating the recommendation list when the second imparting condition has been satisfied.

21. A system configured to impart virtual currency to one or more users, comprising:
   a processor; and
   a memory configured to store computer readable instructions that, when executed by the processor, cause the system to:
      store recommendation lists that includes recommendations to obtain at least one piece of musical piece data, the musical piece data generated based on video game play of a concert game played by one or more terminal devices;
      determine if musical piece data is acquired by a first terminal device based on the recommendation list and impart virtual currency to a second terminal device associated with generating the recommendation list when the musical piece data is acquired by the first terminal device based on the recommendation list; and
      determine if a frequency associated with obtaining one or more pieces of the musical piece data has satisfied a threshold and impart the virtual currency to the second terminal device, associated with creating the one or more pieces of the musical piece data, when the frequency has satisfied the threshold.

22. The system of claim 21, wherein the virtual currency is imparted to the second terminal device when a number of times the musical piece data has been obtained satisfies the threshold.

* * * * *